US012652320B2

(12) United States Patent (10) Patent No.: US 12,652,320 B2
Lin et al. (45) Date of Patent: Jun. 9, 2026

(54) COMMUNICATION METHOD, APPARATUS, AND COMMUNICATION SYSTEM

(71) Applicant: Huawei Technologies Co., Ltd., Shenzhen (CN)

(72) Inventors: Hongda Lin, Dongguan (CN); Shengwen Zhang, Dongguan (CN); Kai Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 18/615,048

(22) Filed: Mar. 25, 2024

(65) Prior Publication Data

US 2024/0236153 A1 Jul. 11, 2024

Related U.S. Application Data

(63) Continuation of application No. PCT/CN2023/070510, filed on Jan. 4, 2023.

(30) Foreign Application Priority Data

Feb. 10, 2022 (CN) .......................... 202210125987.4

(51) Int. Cl.
*H04L 65/1016* (2022.01)
*H04L 65/1069* (2022.01)
*H04L 65/65* (2022.01)

(52) U.S. Cl.
CPC ...... *H04L 65/1016* (2013.01); *H04L 65/1069* (2013.01); *H04L 65/65* (2022.05)

(58) Field of Classification Search
CPC .. H04L 65/1016; H04L 65/65; H04L 65/1069
See application file for complete search history.

(56) References Cited

U.S. PATENT DOCUMENTS 9,883,361 B2 * 1/2018 Suryavanshi ........... H04W 4/16
10,230,694 B2 * 3/2019 Reddy .............. H04N 21/64322
(Continued)

FOREIGN PATENT DOCUMENTS

EP 2978202 A1 1/2016
WO 2021104181 A1 6/2021

OTHER PUBLICATIONS

3GPP TS 26.114 V17.1.0, 3rd Generation Partnership Project; Technical Specification Group Services and System Aspects; IP Multimedia Subsystem (IMS); Multimedia Telephony; Media handling and interaction (Release 17), Jun. 2021, total 468 pages. (Year: 2021).*

(Continued)

*Primary Examiner* — Nazia Naoreen
(74) *Attorney, Agent, or Firm* — Conley Rose, P.C.

(57) ABSTRACT

A communication method includes a data channel service entity that is configured to transmit real-time interaction information between a first user equipment (UE) and a second UE that are in a same call service. The communication method includes establishing a first data channel with the first UE, establishing a first video channel with the second UE; sending, to the second UE through the first video channel, first real-time interaction information sent by the first UE through the first data channel, and/or sending, to the first UE through the first data channel, second real-time interaction information sent by the second UE through the first video channel. The first data channel is used to transmit data according to Stream Control Transmission Protocol (SCTP), and the first video channel is used to transmit data according to User Datagram Protocol (UDP).

20 Claims, 12 Drawing Sheets

(56)         References Cited

U.S. PATENT DOCUMENTS

| | | | | |
|---|---|---|---|---|
| 10,880,120 | B2 * | 12/2020 | Chatterjee | H04L 65/765 |
| 11,722,561 | B2 * | 8/2023 | Westerlund | H04L 63/166 |
| | | | | 709/238 |
| 2015/0195326 | A1 * | 7/2015 | Suryavanshi | H04L 65/65 |
| | | | | 709/231 |
| 2024/0388611 | A1 * | 11/2024 | Yang | H04L 65/1016 |

OTHER PUBLICATIONS

R. Jesup et al,"WebRTC Data Channels", RFC 8831, Jan. 2021, total 14 pages.

K. Drage et al, "Negotiation Data Channels Using the Session Description Protocol (SDP)", RFC 8864, Jan. 2021, total 24 pages.

3GPP TS 23.228 V17.1.0, 3rd Generation Partnership Project; Technical Specification Group Services and System Aspects; IP Multimedia Subsystem (IMS); Stage 2 (Release 17), Jun. 2021, total 352 pages.

3GPP TS 23.218 V16.0.0,3rd Generation Partnership Project; Technical Specification Group Core Network and Terminals; IP Multimedia (IM) session handling; IM call model;Stage 2 (Release 16), Jul. 2020, total 73 pages.

3GPP TS 26.114 V17.1.0, 3rd Generation Partnership Project; Technical Specification Group Services and System Aspects; IP Multimedia Subsystem (IMS); Multimedia Telephony; Media handling and interaction (Release 17), Jun. 2021, total 468 pages.

CMCC et al, "Solutions on interworking between a DCMTSI client in terminal and an MTSI client in terminal," 3GPP TSG-WG SA2 Meeting #151E e-meeting, May 16-20, 2022, Elbonia, S2-2204447, total 5 pages.

"3rd Generation Partnership Project; Technical Specification Group SA; Support of 5G Glass-type Augmented Reality / Mixed Reality (AR/MR) devices; (Release 17)," 3GPP TR 26.998 v1.1.2, Feb. 2022, total 119 pages.

* cited by examiner

| Conversational multimedia application | | | | |
|---|---|---|---|---|
| Speech | Video | Text | RTCP | Data channel |
| Payload formats | | | | SCTP |
| RTP | | | | DTLS |
| UDP | | | | |
| IP | | | | |

Data channel data packet

| IP header | UDP header | DTLS header | SCTP header | RTP data |
|---|---|---|---|---|

Video channel data packet

| IP header | UDP header | RTP data |
|---|---|---|

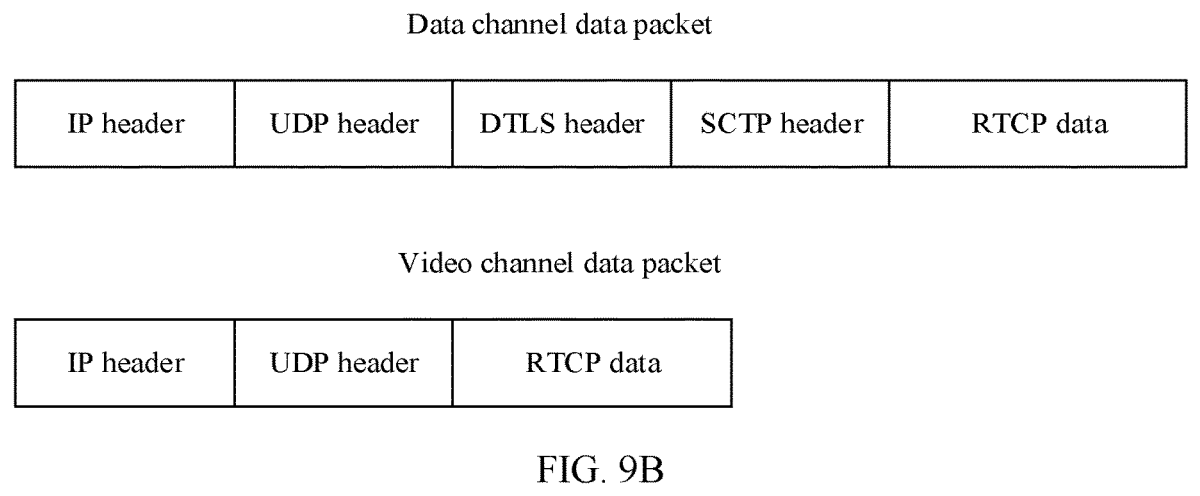

Data channel data packet

| IP header | UDP header | DTLS header | SCTP header | RTCP data |
|-----------|------------|-------------|-------------|-----------|

Video channel data packet

| IP header | UDP header | RTCP data |
|-----------|------------|-----------|

FIG. 9B

COMMUNICATION METHOD, APPARATUS, AND COMMUNICATION SYSTEM

CROSS-REFERENCE TO RELATED APPLICATIONS

This is a continuation of International Patent Application No. PCT/CN2023/070510 filed on Jan. 4, 2023, which claims priority to Chinese Patent Application No. 202210125987.4 filed on Feb. 10, 2022. The disclosures of the aforementioned applications are hereby incorporated by reference in their entireties.

TECHNICAL FIELD

This disclosure relates to the communication field, and in particular, to a communication method, an apparatus, and a communication system.

BACKGROUND

In an Internet Protocol (IP) Multimedia Subsystem (IMS), one or more media channels may be established between a user equipment (UE) and an IMS network, to implement audio and video communication between a calling user and a called user. The media channel includes an audio channel or a video channel. The audio channel may be used to transmit audio information, and the video channel may be used to transmit video information.

With rapid development of internet technologies, in addition to audio and video communication, users also expect to perform real-time interaction in an audio and video communication process. For example, a user in a call may share a screen with another user, or a user in a call may superimpose a virtual element such as a virtual background on UE of another user by using an augmented reality (AR) technology. However, the real-time interaction information cannot be transmitted through the foregoing media channel. To resolve this problem, the 3rd Generation Partnership Project (3GPP) standard organization proposes to establish one or more data channels in parallel with the media channel in an IMS session. The data channel may be used to transmit real-time interaction information of a plurality of types (for example, a text, a picture, a video, a binary stream, or the like), to implement real-time interaction in an audio and video call. For example, as shown in FIG. 1, in addition to an audio channel 104 and a video channel 105, a data channel 103 may be further established between UE 101 and UE 102. The audio channel 104 is used to transmit audio information, the video channel 105 is used to transmit video information, and the data channel 103 is used to transmit real-time interaction information.

However, there are various types of UEs in the current market, and not all types of UEs support establishment of a data channel. In this case, real-time interaction cannot be implemented between UE that supports establishment of a data channel and UE that does not support establishment of a data channel.

SUMMARY

Embodiments of this disclosure provide a communication method, an apparatus, and a communication system, so that real-time interaction can be implemented between a user of UE that supports establishment of a data channel and a user of UE that does not support establishment of a data channel in a call service, or real-time interaction can be implemented between a user of UE that establishes a data channel and a user of UE that fails to establish a data channel in a call service.

To achieve the foregoing objective, the following technical solutions are used in embodiments of this disclosure.

According to a first aspect, a communication method is provided, applied to a data channel service entity. The data channel service entity is configured to transmit real-time interaction information between first user equipment and second user equipment that are in a same call service. An apparatus that performs the method may be a data channel service entity, or may be a module used in a data channel service entity, for example, a chip or a chip system. The following provides descriptions by using an example in which the method is performed by a data channel service entity. The method includes establishing a first data channel with the first user equipment, and establishing a first video channel with the second user equipment, where the first data channel is used to transmit data according to Stream Control Transmission Protocol (SCTP), the first video channel is used to transmit data according to User Datagram Protocol (UDP), the first user equipment supports establishment of a data channel, and the second user equipment does not support establishment of a data channel, or the second user equipment supports establishment of a data channel but does not establish a data channel between the second user equipment and the data channel service entity, and sending, to the second user equipment through the first video channel, first real-time interaction information sent by the first user equipment through the first data channel, and/or sending, to the first user equipment through the first data channel, second real-time interaction information sent by the second user equipment through the first video channel.

Based on the method provided in the first aspect, the data channel service entity may establish the first data channel with the first user equipment, and establish the first video channel with the second user equipment. In this way, the data channel service entity may send, to the second user equipment through the first video channel, the first real-time interaction information sent by the first user equipment through the first data channel, and/or send, to the first user equipment through the first data channel, the second real-time interaction information sent by the second user equipment through the first video channel. Therefore, real-time interaction is implemented between a user of the first user equipment that supports establishment of a data channel and a user of the second user equipment that does not support establishment of a data channel in a call service, or real-time interaction is implemented between a user of the first user equipment that establishes a data channel and a user of the second user equipment that fails to establish a data channel in a call service.

In a possible implementation, sending, to the second user equipment through the first video channel, first real-time interaction information sent by the first user equipment through the first data channel includes receiving first Real-time Transport Protocol (RTP) data from the first user equipment through the first data channel, where the first RTP data includes the first real-time interaction information, and sending the first RTP data to the second user equipment through the first video channel, and sending, to the first user equipment through the first data channel, second real-time interaction information sent by the second user equipment through the first video channel includes receiving second RTP data from the second user equipment through the first video channel, where the second RTP data includes the second real-time interaction information, and sending the second RTP data to the first user equipment through the first data channel.

Based on the foregoing possible implementation, the data channel service entity may send, to the second user equipment through the first video channel, the first RTP data that is received from the first user equipment through the first data channel and that includes the first real-time interaction information, so that the second user equipment may present the first real-time interaction information based on the first RTP data. For example, if the first real-time interaction information includes a mark drawn by a user on a screen, the second user equipment presents the mark on a screen of the second user equipment. In addition/alternatively, the data channel service entity may send, to the first user equipment through the first data channel, the second RTP data that is received from the second user equipment through the first video channel and that includes the second real-time interaction information, so that the first user equipment may present the second real-time interaction information based on the second RTP data. For example, if the second real-time interaction information includes content shot by a camera of the second user equipment, the first user equipment presents the content on a screen of the first user equipment. In this way, real-time interaction can be implemented between the user of the first user equipment that supports establishment of a data channel and the user of the second user equipment that does not support establishment of a data channel in the call service, or real-time interaction can be implemented between the user of the first user equipment that establishes a data channel and the user of the second user equipment that fails to establish a data channel in the call service.

In a possible implementation, the method further includes establishing a second data channel with the first user equipment, and establishing a second video channel with the second user equipment, where the second data channel is used to transmit data according to SCTP, and the second video channel is used to transmit data according to UDP, and sending, to the second user equipment through the second video channel, RTP Control Protocol (RTCP) data sent by the first user equipment through the second data channel, and/or sending, to the first user equipment through the second data channel, RTCP data sent by the second user equipment through the second video channel.

Based on the foregoing possible implementation, the data channel service entity may implement transmission of RTCP data between the first user equipment that supports establishment of a data channel and the second user equipment that does not support establishment of a data channel, or between the first user equipment that establishes a data channel and the second user equipment that fails to establish a data channel, to implement control over RTP data.

In a possible implementation, the method further includes establishing a second video channel with the second user equipment, where the second video channel is used to transmit data according to UDP, and sending, to the second user equipment through the second video channel, RTCP data sent by the first user equipment through the first data channel, and/or sending, to the first user equipment through the first data channel, RTCP data sent by the second user equipment through the second video channel.

Based on the foregoing possible implementation, the data channel service entity may send, to the second user equipment through the second video channel, the RTCP data received from the first user equipment through the first data channel, and/or the data channel service entity may send, to the first user equipment through the first data channel, the RTCP data received from the second user equipment through the second video channel. In the foregoing process, both the RTCP data and the RTP data may share the first data channel. In this way, the first user equipment and the data channel service entity do not need to establish a plurality of data channels to transmit different data (for example, the RTP data and the RTCP data).

In a possible implementation, sending, to the second user equipment through the first video channel, first real-time interaction information sent by the first user equipment through the first data channel includes receiving the first real-time interaction information from the first user equipment through the first data channel, and sending third RTP data to the second user equipment through the first video channel, where the third RTP data includes the first real-time interaction information, and sending, to the first user equipment through the first data channel, second real-time interaction information sent by the second user equipment through the first video channel includes receiving fourth RTP data from the second user equipment through the first video channel, extracting the second real-time interaction information from the fourth RTP data, and sending the second real-time interaction information to the first user equipment through the first data channel.

Based on the foregoing possible implementation, the data channel service entity may send, to the second user equipment by using the third RTP data, the first real-time interaction information received from the first user equipment through the first data channel, and/or extract real-time interaction information from the fourth RTP data received from the second user equipment through the first video channel, and send the extracted second real-time interaction information to the first user equipment through the first data channel. Real-time interaction is implemented between the user of the first user equipment that supports establishment of a data channel and the user of the second user equipment that does not support establishment of a data channel in the call service, or real-time interaction is implemented between the user of the first user equipment that establishes a data channel and the user of the second user equipment that fails to establish a data channel in the call service. In addition, the size of the real-time interaction information is smaller than that of the RTP data, so that traffic between the data channel service entity and the first user equipment can be saved.

In a possible implementation, before establishing a first video channel with the second user equipment, the method further includes determining not to establish a data channel between the data channel service entity and the second user equipment.

Based on the foregoing possible implementation, when the data channel service entity determines not to establish a data channel with the second user equipment, the data channel service entity may establish the first video channel with the second user equipment, so that the data received by the data channel service entity from the first data channel can be sent to the second user equipment through the first video channel.

In a possible implementation, determining not to establish a data channel between the data channel service entity and the second user equipment includes receiving first indication information from the second user equipment, where the first indication information indicates a failure to establish a data channel between the data channel service entity and the second user equipment, and determining, based on the first indication information, not to establish a data channel between the data channel service entity and the second user equipment.

Based on the foregoing possible implementation, when the second user equipment indicates, to the data channel service entity, the failure to establish a data channel between the data channel service entity and the second user equipment, the data channel service entity may determine not to establish a data channel with the second user equipment.

In a possible implementation, receiving first indication information from the second user equipment includes sending first request information to the second user equipment, where the first request information carries media description information used by the data channel service entity to establish a data channel with the second user equipment, and receiving first response information from the second user equipment, where the first response information includes the first indication information.

Based on the foregoing possible implementation, the data channel service entity may trigger, by using the first request information, the second user equipment to send the first response information, to indicate not to establish a data channel between the data channel service entity and the second user equipment.

In a possible implementation, determining not to establish a data channel between the data channel service entity and the second user equipment includes receiving second request information from the second user equipment, and determining, based on a case in which the second request information does not carry media description information used by the second user equipment to establish a data channel with the data channel service entity, not to establish a data channel between the second user equipment and the data channel service entity.

Based on the foregoing possible implementation, when the second request information does not carry the media description information used by the second user equipment to establish a data channel with the data channel service entity, the data channel service entity may determine not to establish a data channel with the second user equipment.

In a possible implementation, after determining not to establish a data channel between the data channel service entity and the second user equipment, the method further includes sending third indication information to the first user equipment, where the third indication information indicates not to establish a data channel between the second user equipment and the data channel service entity.

Based on the foregoing possible implementation, the data channel service entity may send the third indication information to the first user equipment after determining not to establish a data channel between the data channel service entity and the second user equipment, to indicate, to the first user equipment, not to establish a data channel between the second user equipment and the data channel service entity.

In a possible implementation, before sending third indication information to the first user equipment, the method further includes receiving third request information from the first user equipment, where the third request information is used to request information about whether to establish a data channel between the second user equipment and the data channel service entity.

Based on the foregoing possible implementation, the data channel service entity may send the third indication information to the first user equipment based on a request of the first user equipment, to indicate, to the first user equipment, not to establish a data channel between the second user equipment and the data channel service entity.

In a possible implementation, the method further includes establishing a third data channel with the first user equipment, receiving third request information from the first user equipment includes receiving the third request information from the first user equipment through the third data channel, and sending third indication information to the first user equipment includes sending the third indication information to the first user equipment through the third data channel.

Based on the foregoing possible implementation, the data channel service entity may establish the third data channel with the first user equipment, to transmit the third request information and the third indication information.

In a possible implementation, before establishing a first video channel with the second user equipment, the method further includes receiving fourth request information from the first user equipment through the third data channel, where the fourth request information carries first media description information and second indication information, the first media description information carries a parameter of RTP data (for example, an encoding/decoding parameter of the RTP data) transmitted by the first user equipment through the first data channel, and the second indication information is used to request to establish the first video channel, sending fifth request information to the second user equipment, where the fifth request information carries second media description information, and the second media description information is media description information used by the data channel service entity to establish the first video channel, receiving second response information from the second user equipment, where the second response information carries third media description information, and the third media description information is media description information used by the second user equipment to establish the first video channel, and sending third response information to the first user equipment through the third data channel, where the third response information carries fourth media description information, and the fourth media description information carries a parameter of RTP data transmitted by the data channel service entity through the first data channel.

Based on the foregoing possible implementation, the data channel service entity can negotiate with the first user equipment about the parameter of the RTP data transmitted through the first data channel, and can negotiate, based on the fourth request information received from the first user equipment through the third data channel, with the second user equipment about media description information for establishing the first video channel, to establish the first video channel.

In a possible implementation, before establishing a first video channel with the second user equipment, the method further includes receiving fourth request information from the first user equipment, where the fourth request information carries first media description information and second indication information, the first media description information carries a parameter of RTP data (for example, an encoding/decoding parameter of the RTP data) transmitted by the first user equipment through the first data channel, and the second indication information is used to request to establish the first video channel, sending fifth request information to the second user equipment, where the fifth request information carries second media description information, and the second media description information is media description information used by the data channel service entity to establish the first video channel, receiving second response information from the second user equipment, where the second response information carries third media description information, and the third media description information is media description information used by the second user equipment to establish the first video channel, and sending third response information to the first user equipment, where the third response information carries fourth media description information, and the fourth media description information carries a parameter of RTP data transmitted by the data channel service entity through the first data channel.

Based on the foregoing possible implementation, the data channel service entity can negotiate with the first user equipment about the parameter of the RTP data transmitted through the first data channel, and can negotiate, based on a request of the first user equipment, with the second user equipment about media description information for establishing the first video channel, to establish the first video channel.

In a possible implementation, the method further includes establishing a fourth data channel with the first user equipment, receiving fourth request information from the first user equipment includes receiving the fourth request information from the first user equipment through the fourth data channel, and sending third response information to the first user equipment includes sending the third response information to the first user equipment through the fourth data channel.

Based on the foregoing possible implementation, the data channel service entity may establish the fourth data channel with the first user equipment, to transmit the fourth request information and the third response information.

In a possible implementation, the fourth request information further carries an identifier of the first data channel, and the third response information further carries the identifier of the first data channel.

Based on the foregoing possible implementation, the fourth request information further carries the identifier of the first data channel, to indicate, to the data channel service entity, a data channel used to transmit RTP data. The third response information further carries the identifier of the first data channel, to indicate, to the first user equipment, a data channel used to transmit RTP data.

In a possible implementation, the fourth request information further carries an identifier of the second data channel, and the third response information further carries the identifier of the second data channel.

Based on the foregoing possible implementation, the fourth request information further carries the identifier of the second data channel, to indicate, to the data channel service entity, a data channel used to transmit RTCP data. The third response information further carries the identifier of the second data channel, to indicate, to the first user equipment, a data channel for transmitting RTCP data by a user.

In a possible implementation, the method further includes establishing a correspondence between the first video channel and the first data channel, and establishing a correspondence between the second video channel and the second data channel.

Based on the foregoing possible implementation, the data channel service entity may establish the correspondence between the first video channel and the first data channel, so that the data channel service entity can send, to the second user equipment through the first video channel, real-time interaction information sent by the first user equipment through the first data channel. The data channel service entity may further establish the correspondence between the second video channel and the second data channel, so that the data channel service entity can send, to the first user equipment through the first data channel, real-time interaction information sent by the second user equipment through the first video channel.

In a possible implementation, the first user equipment is calling-party user equipment, and the second user equipment is called-party user equipment, or the first user equipment is called-party user equipment, and the second user equipment is calling-party user equipment.

Based on the foregoing possible implementation, when the first user equipment is calling-party user equipment and the second user equipment is called-party user equipment, or when the first user equipment is called-party user equipment and the second user equipment is calling-party user equipment, the method provided in any one of the first aspect or the possible implementations of the first aspect is applicable.

In a possible implementation, the first user equipment is a data channel of multimedia telephony service for an IMS (DCMTSI) client, and the second user equipment is a multimedia telephony service for IMS (MTSI) client.

Based on the foregoing possible implementation, the DCMTSI client and the MTSI client may be applicable to the method provided in any one of the first aspect or the possible implementations of the first aspect.

According to a second aspect, a communication method is provided. An apparatus that performs the method may be user equipment, or may be a module used in user equipment, for example, a chip or a chip system. The user equipment and peer user equipment are in a same call service. The user equipment and the peer user equipment transmit real-time interaction information through a data channel service entity. The peer user equipment is any one or more user equipments except the user equipment in a plurality of user equipments involved in one call service. For example, the plurality of user equipments involved in the call service are first user equipment and second user equipment. If the user equipment is the first user equipment, the peer user equipment is the second user equipment. The user equipment supports establishment of a data channel, and the peer user equipment does not support establishment of a data channel. Alternatively, the peer user equipment supports establishment of a data channel, but no data channel is established between the peer user equipment and the data channel service entity. The following provides descriptions by using an example in which the method is performed by user equipment. The method includes establishing a first data channel with the data channel service entity and triggering the data channel service entity to establish a first video channel with the peer user equipment, where the first data channel is used to transmit data according to SCTP, and the first video channel is used to transmit data according to UDP, sending first real-time interaction information to the data channel service entity through the first data channel, to trigger the data channel service entity to send the first real-time interaction information to the peer user equipment through the first video channel, and/or receiving, from the data channel service entity through the first data channel, second real-time interaction information received by the data channel service entity through the first video channel.

Based on the method provided in the second aspect, the user equipment may establish the first data channel with the data channel service entity, and trigger the data channel service entity to establish the first video channel with the peer user equipment. In this way, the first real-time interaction information sent by the user equipment through the first data channel may be forwarded to the peer user equipment by the data channel service entity through the first video channel, and the user equipment may also receive, from the data channel service entity through the first data channel, the second real-time interaction information received by the data channel service entity through the first video channel.

Therefore, real-time interaction between a user of the user equipment that supports establishment of a data channel and a user of the peer user equipment that does not support establishment of a data channel in a call service is implemented, or real-time interaction between a user of the user equipment that establishes a data channel and a user of the peer user equipment that fails to establish a data channel in a call service is implemented.

In a possible implementation, sending first real-time interaction information to the data channel service entity through the first data channel, to trigger the data channel service entity to send the first real-time interaction information to the peer user equipment through the first video channel includes sending first RTP data to the data channel service entity through the first data channel, to trigger the data channel service entity to send the first RTP data to the peer user equipment through the first video channel, where the first RTP data includes the first real-time interaction information, and receiving, from the data channel service entity through the first data channel, second real-time interaction information received by the data channel service entity through the first video channel includes receiving, from the data channel service entity through the first data channel, second RTP data received by the data channel service entity through the first video channel, where the second RTP data includes the second real-time interaction information.

Based on the foregoing possible implementation, the first user equipment may send the first RTP data including the first real-time interaction information to the data channel service entity through the first data channel, to trigger the data channel service entity to send the first RTP data to the second user equipment through the first video channel. In this way, the second user equipment may present the first real-time interaction information based on the first RTP data. For example, if the first real-time interaction information includes a mark drawn by a user on a screen, the second user equipment presents the mark on a screen of the second user equipment. In addition/alternatively, the first user equipment may receive, from the data channel service entity through the first data channel, the second RTP data that is received by the data channel service entity through the first video channel and that includes the second real-time interaction information. In this way, the first user equipment may present the second real-time interaction information based on the second RTP data. For example, if the second real-time interaction information includes content shot by a camera of the second user equipment, the first user equipment presents the content on a screen of the first user equipment. In this way, real-time interaction can be implemented between the user of the first user equipment that supports establishment of a data channel and the user of the second user equipment that does not support establishment of a data channel in the call service, or real-time interaction can be implemented between the user of the first user equipment that establishes a data channel and the user of the second user equipment that fails to establish a data channel in the call service.

In a possible implementation, the method further includes establishing a second data channel with the data channel service entity and triggering the data channel service entity to establish a second video channel with the peer user equipment, where the second data channel is used to transmit data according to SCTP, and the second video channel is used to transmit data according to UDP, sending RTCP data to the data channel service entity through the second data channel, to trigger the data channel service entity to send the RTCP data to the peer user equipment through the second video channel, and/or receiving, from the data channel service entity through the second data channel, RTCP data received by the data channel service entity through the second video channel, to implement control over RTP data.

Based on the foregoing possible implementation, the RTCP data sent by the user equipment through the second data channel may be forwarded to the peer user equipment by the data channel service entity through the second video channel, and the user equipment may also receive, from the data channel service entity through the second data channel, the RTCP data received by the data channel service entity through the second video channel. Therefore, transmission of RTCP data is implemented between the user equipment that supports establishment of a data channel and the peer user equipment that does not support establishment of a data channel, or between the user equipment that establishes a data channel and the peer user equipment that fails to establish a data channel, and then, RTP data can be controlled.

In a possible implementation, the method further includes sending RTCP data to the data channel service entity through the first data channel, to trigger the data channel service entity to send the RTCP data to the peer user equipment through a second video channel, where the second video channel is used to transmit data according to UDP, and/or receiving, from the data channel service entity through the first data channel, RTCP data received by the data channel service entity through the second video channel.

Based on the foregoing possible implementation, both the RTCP data and the RTP data may share the first data channel. In this way, the first user equipment and the data channel service entity do not need to establish a plurality of data channels to transmit different data (for example, the RTP data and the RTCP data).

In a possible implementation, triggering the data channel service entity to establish a first video channel with the peer user equipment includes sending fourth request information to the data channel service entity, where the fourth request information carries first media description information and second indication information, the first media description information carries a parameter of RTP data (for example, an encoding/decoding parameter of the RTP data) transmitted by the user equipment through the first data channel, and the second indication information is used to request to establish the first video channel, and receiving third response information from the data channel service entity, where the third response information carries fourth media description information, and the fourth media description information carries a parameter of RTP data transmitted by the data channel service entity through the first data channel.

Based on the foregoing possible implementation, the user equipment can negotiate with the data channel service entity about the parameter of the RTP data transmitted through the first data channel, and can trigger the data channel service entity to establish the first video channel with the peer user equipment. Therefore, real-time interaction between the user equipment that supports establishment of a data channel and the peer user equipment that does not support establishment of a data channel in the call service, or real-time interaction between the user equipment that establishes a data channel and the peer user equipment that fails to establish a data channel in the call service is implemented.

In a possible implementation, before sending fourth request information to the data channel service entity, the method further includes receiving third indication information from the data channel service entity, where the third indication information indicates not to establish a data channel between the peer user equipment and the data channel service entity.

Based on the foregoing possible implementation, the user equipment may receive the third indication information from the data channel service entity, so that the user equipment determines whether to establish a data channel between the user equipment and the peer user equipment. If a data channel is established between the peer user equipment and the data channel service entity, the user equipment determines to establish a data channel between the user equipment and the peer user equipment, and the user equipment and the peer user equipment may directly transmit real-time interaction information. If no data channel is established between the peer user equipment and the data channel service entity, the user equipment determines to establish a data channel between the user equipment and the data channel service entity. In this case, the data channel service entity may establish a video channel with the peer user equipment. In this way, a data packet format is converted by the data channel service entity, so that real-time interaction information can be transmitted between the user equipment and the peer user equipment.

In a possible implementation, before receiving third indication information from the data channel service entity, the method further includes sending third request information to the data channel service entity, where the third request information is used to request information about whether to establish a data channel between the peer user equipment and the data channel service entity.

Based on the foregoing possible implementation, the user equipment may query the data channel service entity about whether to establish a data channel between the peer user equipment and the data channel service entity, so that the user equipment determines whether to establish, between the user equipment and the peer user equipment, a data channel used to transmit real-time interaction information.

In a possible implementation, the method further includes establishing a third data channel with the data channel service entity, sending third request information to the data channel service entity includes sending the third request information to the data channel service entity through the third data channel, and receiving third indication information from the data channel service entity includes receiving the third indication information from the data channel service entity through the third data channel.

Based on the foregoing possible implementation, the user equipment may establish the third data channel with the data channel service entity, to transmit the third request information and the third indication information.

In a possible implementation, sending fourth request information to the data channel service entity includes sending the fourth request information to the data channel service entity through the third data channel, and receiving third response information from the data channel service entity includes receiving the third response information from the data channel service entity through the third data channel.

Based on the foregoing possible implementation, the third data channel can be further used to transmit the fourth request information and the third response information.

In a possible implementation, the method further includes establishing a fourth data channel with the data channel service entity, sending fourth request information to the data channel service entity includes sending the fourth request information to the data channel service entity through the fourth data channel, and receiving third response information from the data channel service entity includes receiving the third response information from the data channel service entity through the fourth data channel.

Based on the foregoing possible implementation, the user equipment may establish the fourth data channel with the data channel service entity, to transmit the fourth request information and the third response information.

In a possible implementation, the fourth request information further carries an identifier of the first data channel, and the third response information further carries the identifier of the first data channel.

Based on the foregoing possible implementation, the fourth request information further carries the identifier of the first data channel, to indicate, to the data channel service entity, a data channel used to transmit RTP data. The third response information further carries the identifier of the first data channel, to indicate, to the user equipment, a data channel used to transmit RTP data.

In a possible implementation, the fourth request information further carries an identifier of the second data channel, and the third response information further carries the identifier of the second data channel.

Based on the foregoing possible implementation, the fourth request information further carries the identifier of the second data channel, to indicate, to the data channel service entity, a data channel used to transmit RTCP data. The third response information further carries the identifier of the second data channel, to indicate, to the user equipment, a data channel for transmitting RTCP data by a user.

In a possible implementation, the user equipment is calling-party user equipment or called-party user equipment.

Based on the foregoing possible implementation, when the user equipment is calling-party user equipment, or when the user equipment is called-party user equipment, the method provided in any one of the second aspect or the possible implementations of the second aspect is applicable.

In a possible implementation, the user equipment is a data channel of multimedia telephony service for an IMS DCMTSI client.

Based on the foregoing possible implementation, the DCMTSI client may be applicable to the method provided in any one of the second aspect or the possible implementations of the second aspect.

According to a third aspect, a communication method is provided, applied to a data channel service entity. The data channel service entity is configured to transmit real-time interaction information between first user equipment and second user equipment that are in a same call service. An apparatus that performs the method may be a data channel service entity, or may be a module used in a data channel service entity, for example, a chip or a chip system. The following provides descriptions by using an example in which the method is performed by a data channel service entity. The method includes receiving third request information from the first user equipment, where the third request information is used to request information about whether to establish a data channel between the second user equipment and the data channel service entity, and sending third indication information to the first user equipment, where the third indication information indicates whether to establish a data channel between the second user equipment and the data channel service entity.

Based on the method provided in the third aspect, the data channel service entity may indicate, based on an inquiry of the first user equipment, to the first user equipment whether to establish a data channel between the second user equipment and the data channel service entity, so that the first user equipment determines whether to establish, between the first user equipment and the second user equipment, a data channel used to transmit real-time interaction information. If a data channel is established between the second user equipment and the data channel service entity, the first user equipment determines to establish, between the first user equipment and the second user equipment, the data channel used to transmit the real-time interaction information, and the first user equipment and the second user equipment may directly transmit the real-time interaction information. If no data channel is established between the second user equipment and the data channel service entity, the first user equipment determines to establish, between the first user equipment and the data channel service entity, a data channel (for example, a first data channel) used to transmit real-time interaction information. In this case, the data channel service entity may establish a video channel with the second user equipment. In this way, a data packet format is converted by the data channel service entity, so that real-time interaction information can be transmitted between the first user equipment and the second user equipment.

In a possible implementation, the third indication information indicates not to establish a data channel between the second user equipment and the data channel service entity, and the method further includes determining not to establish a data channel between the data channel service entity and the second user equipment.

Based on the foregoing possible implementation, when determining not to establish a data channel between the data channel service entity and the second user equipment, the data channel service entity may indicate, to the first user equipment by using the third indication information, not to establish a data channel between the second user equipment and the data channel service entity.

In a possible implementation, determining not to establish a data channel between the data channel service entity and the second user equipment includes receiving first indication information from the second user equipment, where the first indication information indicates not to establish a data channel between the data channel service entity and the second user equipment.

Based on the foregoing possible implementation, when the second user equipment indicates, to the data channel service entity, a failure to establish a data channel between the data channel service entity and the second user equipment, the data channel service entity may determine not to establish a data channel with the second user equipment.

In a possible implementation, receiving first indication information from the second user equipment includes sending first request information to the second user equipment, where the first request information carries media description information used by the data channel service entity to establish a data channel with the second user equipment, and receiving first response information from the second user equipment, where the first response information includes the first indication information.

Based on the foregoing possible implementation, the data channel service entity may trigger, by using the first request information, the second user equipment to send the first response information, to indicate not to establish a data channel between the data channel service entity and the second user equipment.

In a possible implementation, determining not to establish a data channel between the data channel service entity and the second user equipment includes receiving second request information from the second user equipment, and determining, based on a case in which the second request information does not carry media description information used by the second user equipment to establish a data channel with the data channel service entity, not to establish a data channel between the second user equipment and the data channel service entity.

Based on the foregoing possible implementation, when the second request information does not carry the media description information used by the second user equipment to establish a data channel with the data channel service entity, the data channel service entity may determine not to establish a data channel with the second user equipment.

In a possible implementation, the method further includes establishing a third data channel with the first user equipment, receiving third request information from the first user equipment includes receiving the third request information from the first user equipment through the third data channel, and sending third indication information to the first user equipment includes sending the third indication information to the first user equipment through the third data channel.

Based on the foregoing possible implementation, the data channel service entity may establish the third data channel with the first user equipment, to transmit the third request information and the third indication information.

In a possible implementation, the first user equipment is calling-party user equipment, and the second user equipment is called-party user equipment, or the first user equipment is called-party user equipment, and the second user equipment is calling-party user equipment.

Based on the foregoing possible implementation, when the first user equipment is calling-party user equipment and the second user equipment is called-party user equipment, or when the first user equipment is called-party user equipment and the second user equipment is calling-party user equipment, the method provided in any one of the third aspect or the possible implementations of the third aspect is applicable.

In a possible implementation, the first user equipment is a data channel of multimedia telephony service for an IMS DCMTSI client, and the second user equipment is a MTSI client.

Based on the foregoing possible implementation, the DCMTSI client and the MTSI client may be applicable to the method provided in any one of the third aspect or the possible implementations of the third aspect.

According to a fourth aspect, a communication method is provided. An apparatus that performs the method may be user equipment, or may be a module used in user equipment, for example, a chip or a chip system. The user equipment and peer user equipment are in a same call service. The user equipment and the peer user equipment transmit real-time interaction information through a data channel service entity. The peer user equipment is any one or more user equipments except the user equipment in a plurality of user equipments involved in one call service. For example, the plurality of user equipments involved in the call service are first user equipment and second user equipment. If the user equipment is the first user equipment, the peer user equipment is the second user equipment. The user equipment supports establishment of a data channel, and the peer user equipment does not support establishment of a data channel. Alternatively, the peer user equipment supports establishment of a data channel, but no data channel is established between the peer user equipment and the data channel service entity. The following provides descriptions by using an example in which the method is performed by user equipment. The method includes sending third request information to the data channel service entity, where the third request information is used to request information about whether to establish a data channel between the peer user equipment and the data channel service entity, and receiving third indication information from the data channel service entity, where the third indication information indicates whether to establish a data channel between the peer user equipment and the data channel service entity.

Based on the method provided in the fourth aspect, the user equipment may query the data channel service entity about whether to establish a data channel between the peer user equipment and the data channel service entity, so that the user equipment determines whether to establish, between the user equipment and the peer user equipment, a data channel used to transmit real-time interaction information. If a data channel is established between the peer user equipment and the data channel service entity, the user equipment determines to establish, between the user equipment and the peer user equipment, the data channel used to transmit the real-time interaction information, and the user equipment and the peer user equipment may directly transmit the real-time interaction information. If no data channel is established between the peer user equipment and the data channel service entity, the user equipment determines to establish, between the user equipment and the data channel service entity, a data channel used to transmit real-time interaction information. In this case, the data channel service entity may establish a video channel with the peer user equipment. In this way, a data packet format is converted by the data channel service entity, so that real-time interaction information can be transmitted between the user equipment and the peer user equipment.

In a possible implementation, the method further includes establishing a third data channel with the data media service entity, sending third request information to the data channel service entity includes sending the third request information to the data channel service entity through the third data channel, and receiving third indication information from the data channel service entity includes receiving the third indication information from the data channel service entity through the third data channel.

Based on the foregoing possible implementation, the user equipment may establish the third data channel with the data channel service entity, to transmit the third request information and the third indication information.

In a possible implementation, the user equipment is calling-party user equipment or called-party user equipment.

Based on the foregoing possible implementation, when the user equipment is calling-party user equipment, or when the user equipment is called-party user equipment, the method provided in any one of the fourth aspect or the possible implementations of the fourth aspect is applicable.

In a possible implementation, the user equipment is a data channel of multimedia telephony service for an IMS DCMTSI client.

Based on the foregoing possible implementation, the DCMTSI client may be applicable to the method provided in any one of the first aspect or the possible implementations of the first aspect.

According to a fifth aspect, a data channel service entity is provided, and is configured to implement the method in the first aspect or the third aspect. The data channel service entity includes a corresponding module, unit, or means for implementing the method in the first aspect or the method in the third aspect. The module, unit, or means may be implemented by hardware, software, or hardware executing corresponding software. The hardware or the software includes one or more modules or units corresponding to the foregoing functions.

According to a sixth aspect, user equipment is provided to implement the method in the second aspect or the fourth aspect. The user equipment includes a corresponding module, unit, or means for implementing the method in the second aspect or the method in the fourth aspect. The module, unit, or means may be implemented by hardware, software, or hardware executing corresponding software. The hardware or the software includes one or more modules or units corresponding to the foregoing functions.

According to a seventh aspect, a data channel service entity is provided, including a processor. The processor is configured to be coupled to a memory, read instructions in the memory, and then perform the method according to the first aspect or the third aspect based on the instructions.

With reference to the seventh aspect, in a possible implementation, the data channel service entity further includes a memory. The memory is configured to store necessary program instructions and necessary data.

With reference to the seventh aspect, in a possible implementation, the data channel service entity is a chip or a chip system. Optionally, when the data channel service entity is a chip system, the data channel service entity may include a chip, or may include a chip and another discrete device.

According to an eighth aspect, user equipment is provided, including a processor. The processor is configured to be coupled to a memory, read instructions in the memory, and then perform the method according to the second aspect or the fourth aspect based on the instructions.

With reference to the eighth aspect, in a possible implementation, the user equipment further includes a memory. The memory is configured to store necessary program instructions and necessary data.

With reference to the eighth aspect, in a possible implementation, the user equipment is a chip or a chip system. Optionally, when the user equipment is a chip system, the user equipment may include a chip, or may include a chip and another discrete device.

According to a ninth aspect, a data channel service entity is provided, including a processor and an interface circuit. The interface circuit is configured to receive a computer program or instructions and transmit the computer program or the instructions to the processor. The processor is configured to execute the computer program or the instructions, to enable the data channel service entity to perform the method according to the first aspect or the third aspect.

With reference to the ninth aspect, in a possible implementation, the data channel service entity is a chip or a chip system. Optionally, when the data channel service entity is a chip system, the data channel service entity may include a chip, or may include a chip and another discrete device.

According to a tenth aspect, user equipment is provided, including a processor and an interface circuit. The interface circuit is configured to receive a computer program or instructions and transmit the computer program or the instructions to the processor. The processor is configured to execute the computer program or the instructions, to enable the user equipment to perform the method according to the second aspect or the fourth aspect.

With reference to the tenth aspect, in a possible implementation, the user equipment is a chip or a chip system. Optionally, when the user equipment is a chip system, the user equipment may include a chip, or may include a chip and another discrete device.

According to an eleventh aspect, a computer-readable storage medium is provided. The computer-readable storage medium stores instructions. When the instructions are run on a computer, the computer is enabled to perform the method according to any one of the foregoing aspects.

According to a twelfth aspect, a computer program product including instructions is provided. When the computer program product is run on a computer, the computer is enabled to perform the method according to any one of the foregoing aspects.

For technical effects brought by any possible implementation in the fifth aspect to the twelfth aspect, refer to technical effects brought by any one of the first aspect to the fourth aspect or different possible implementations in any one of the aspects. Details are not described herein again.

According to a thirteenth aspect, a communication system is provided. The communication system includes a data channel service entity configured to perform the method according to the first aspect, and user equipment configured to perform the method according to the second aspect.

According to a fourteenth aspect, a communication system is provided. The communication system includes a data channel service entity configured to perform the method according to the third aspect, and user equipment configured to perform the method according to the fourth aspect.

It may be understood that the solutions in the foregoing aspects may be combined on a premise that the solutions are not contradictory.

BRIEF DESCRIPTION OF DRAWINGS

FIG. 9B is a schematic diagram of a data channel data packet and a video channel data packet according to an embodiment of this disclosure;

DESCRIPTION OF EMBODIMENTS

Figures 1, 2:
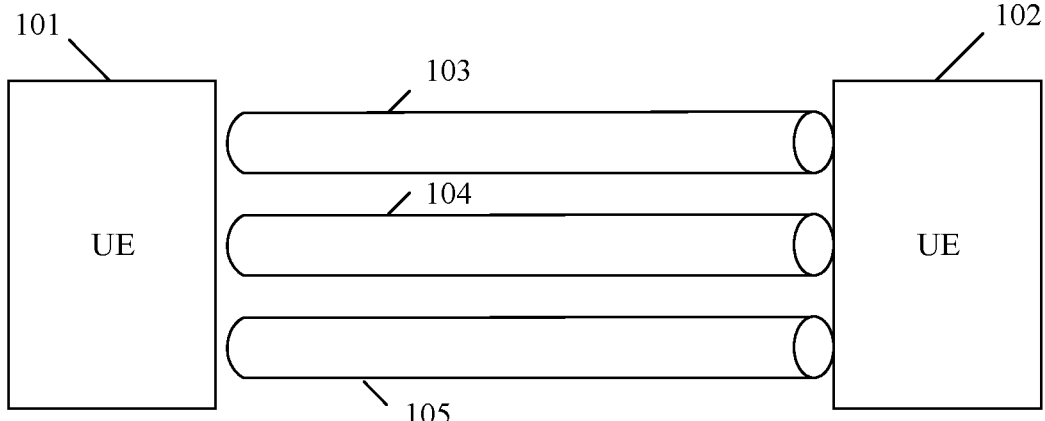
FIG. 1 is a schematic diagram of an audio channel, a video channel, and a data channel according to an embodiment of this disclosure.
FIG. 2 is a schematic diagram of a protocol stack of UE according to an embodiment of this disclosure.

Before embodiments of this disclosure are described, related technical terms in embodiments of this disclosure are explained and described. It may be understood that these explanations and descriptions are intended to facilitate understanding of embodiments of this disclosure, but cannot be construed as limiting the protection scope claimed in embodiments of this disclosure.

1. UE:

The user equipment in embodiments of this disclosure is a device of a terminal user. The device may have a wireless communication capability, and may be connected to a wireless access device through an air interface. Alternatively, the device may have a wired communication capability, and may be connected to a wired access device through a wired interface. From a perspective of a product form, the device may be a smartphone, a laptop computer having a wireless communication function, a tablet computer, a wearable device (such as a smartwatch, a smart band, smart glasses, or the like), an augmented reality (AR) device, an Internet of Things (IoT) device, a desktop computer of an office desktop, or the like. The user equipment in embodiments of this disclosure may be UE defined in a 3GPP standard specification.

2. Call Service:

The call service in embodiments of this disclosure is a speech call service or a video call service that is performed between user equipment and one or more other user equipments through a communication network. The user equipment participates in the service as a calling party or a called party. The call service may cover an entire process from the start of dialing to the end of the call, or may cover a part of the process from the start of dialing to the end of the call, for example, a process from the time when parties participating in the call service enter a call state to the time when the call ends. The call service may be a one-to-one call service, or may be a one-to-many (for example, a conference) call service. In embodiments of this disclosure, the one-to-one call service is used as an example, but all related solutions may be applied to the one-to-many call service.

In embodiments of this disclosure, "UE 1 and UE 2 are in a same call service" means that both UE 1 and UE 2 are participants of a same call service. UE 1 is calling-party user equipment, and UE 2 is called-party user equipment. Alternatively, UE 1 is called-party user equipment, and UE 2 is calling-party user equipment. When the call service is a one-to-many call service, both UE 1 and UE 2 may be called-party user equipment.

3. Audio and Video Exchange Content:

The audio and video exchange content in embodiments of this disclosure is audio content transmitted in real time between participant user equipments in a speech call service to implement speech exchange, or audio content and/or video content transmitted in real time between participant user equipments in a video call service to implement video exchange.

4. Real-Time Interaction Information:

The real-time interaction information in embodiments of this disclosure is information that is closely related to a multimedia telephony session and that is used for real-time interaction except a speech call and/or a video call between participants of a call service. In other words, the real-time interaction information is information that is closely related to a multimedia telephony session and that is used for real-time interaction between participants of a call service except audio and video exchange content.

In an example, the real-time interaction information may include at least one of the following: content shot by a camera of user equipment, information generated by a thumbs-up, desktop sharing content, a mark drawn by a user on a screen, a text message entered by the user, picture information entered by the user, geographical location information, or video content in a video file. The information may be produced or consumed by either calling-party user equipment or called-party user equipment, or may be produced or consumed by a device connected to the calling-party user equipment or the called-party user equipment.

Optionally, the real-time interaction information is processed by specific application logic on the calling-party user equipment, and/or the called-party user equipment, and/or the device connected to the calling-party user equipment or the called-party user equipment.

Optionally, the real-time interaction information is presented on the calling-party user equipment, and/or the called-party user equipment, and/or the device connected to the calling-party user equipment or the called-party user equipment, and is controlled by a user interface.

5. Data Channel:

The data channel in embodiments of this disclosure is also referred to as an IMS data channel, namely, a data channel in IMS, and may be used to transmit data based on the SCTP. In other words, the data channel is a logical channel or a data connection for transmitting data according to SCTP.

Based on different purposes, data channels may be classified into bootstrap data channels and application data channels. Details are as follows. The bootstrap data channels are data channels used to transmit a bootstrap application, and may also be referred to as "underlying data channels", "bootstrap data channels", or "initialized data channels". The application data channels are data channels used to transmit service data (such as real-time interaction information, audio and video exchange content, or signaling) of an application, may also be referred to as "other data channels" or "additional data channels", and may be used by a data channel application.

In a possible design, the application data channels may be further classified into "signaling application data channels"

and "media information application data channels" based on different purposes. The signaling application data channels are application data channels used to transmit signaling, and the media information application data channels are application data channels used to transmit media information. The media information transmitted through the media information application data channels may include audio information and/or video information.

For example, the data channel (for example, a first data channel) in embodiments of this disclosure may be used to transmit RTP data, but is not used to transmit RTCP data. Alternatively, the data channel may be used to transmit both RTP data and RTCP data. In embodiments of this disclosure, the RTP data transmitted through the data channel may include real-time interaction information. For example, the real-time interaction information is superimposed in a video frame, and data of the video frame is carried in the RTP data. In this way, the RTP data includes the real-time interaction information. Optionally, the RTP data transmitted through the data channel may alternatively include audio and video exchange content. The data channel is an application data channel, and may be further referred to as an application data channel used to transmit media information or a media information application data channel.

For example, the data channel (for example, a second data channel) in embodiments of this disclosure may be further used to transmit RTCP data, but is not used to transmit RTP data. The data channel is also an application data channel, and may also be further referred to as an application data channel used to transmit media information or a media information application data channel.

For example, the data channel (for example, a third data channel) in embodiments of this disclosure may be further used to transmit a bootstrap application. The data channel is a bootstrap data channel.

For example, the data channel (for example, a fourth data channel or a second signaling application data channel) in embodiments of this disclosure may be used to transmit signaling. The data channel is an application data channel, and may be further referred to as an application data channel used to transmit signaling or a signaling application data channel.

It may be understood that names of the data channel in this disclosure are merely intended for differentiation instead of limitation.

6. MTSI Client and DCMTSI Client:

According to a 3GPP standard specification, the MTSI client in embodiments of this disclosure is UE or a network entity that supports a function of MTSI, and the DCMTSI client is an MTSI client that can establish a data channel.

It may be understood that, in embodiments of this disclosure, user equipment that can establish a data channel may be a DCMTSI client, for example, first UE, UE, UE 302, UE 312, or UE 401 in the following embodiments of this disclosure. User equipment that cannot establish a data channel may be an MTSI client, for example, second UE, peer UE, UE 303, UE 313, or UE 402 in the following embodiments of this disclosure.

It may be understood that, in embodiments of this disclosure, UE that did not establish a data channel, UE that does not establish a data channel, or UE that fails to establish a data channel may be a DCMTSI client or an MTSI client. If the UE is a DCMTSI client, it indicates that although the UE supports establishment of a data channel, the data channel is not established due to some reasons (for example, a network resource shortage), for example, the second UE, the peer UE, the UE 303, the UE 313, or the UE 402 in the following embodiments of this disclosure.

7. Protocol Stack of UE:

In embodiments of this disclosure, the protocol stack applicable to the UE may be shown in FIG. 2. In FIG. 2, a bottom layer is the IP. On the top of the IP is the UDP. For a data channel, on the top of UDP is the Datagram Transport Layer Security (DTLS) protocol, on the top of the DTLS protocol is SCTP, on the top of SCTP is the data channel, and on the top of the data channel is a conversational multimedia application. For a media channel, such as an audio channel or a video channel, on the top of UDP is RTP or RTCP. On the top of the RTP are payload formats, and on the top of the payload formats is a speech, video, or text. On the top of the speech, video, or text is a conversational multimedia application. On the top of the RTCP is also the conversational multimedia application.

8. Session Initiation Protocol (SIP) Session:

The SIP session in embodiments of this disclosure may represent an end-to-end SIP relationship that lasts for a period of time between two UEs in a call service. The SIP session helps to sort messages between two UEs in a call service, and enables requests between the two UEs to be correctly routed. A SIP session may be understood as a context for interpreting a SIP message. A SIP session can be constructed by using a request and a response. After the SIP session is set up, a request and a response can be sent in the SIP session. For example, a SIP session may be constructed between two UEs by using an invite request (INVITE) message and a 183 message. After the SIP session is set up, the UEs may further send a reinvite request (reINVITE) message and a 200 message in the SIP session.

The following describes implementations of embodiments of this disclosure in detail with reference to the accompanying drawings.

A method provided in embodiments of this disclosure may be applied to various communication systems. For example, the communication system may be a Long-Term Evolution (LTE) system, a 5th generation (5G) communication system, a WI-FI system, a 3GPP related communication system, a future evolved communication system, or a system integrating a plurality of systems. This is not limited. 5G may also be referred to as New Radio (NR). The following uses a communication system 30 shown in FIG. 3A and a communication system 31 shown in FIG. 3B as examples to describe the method provided in embodiments of this disclosure.

Figure 3A:
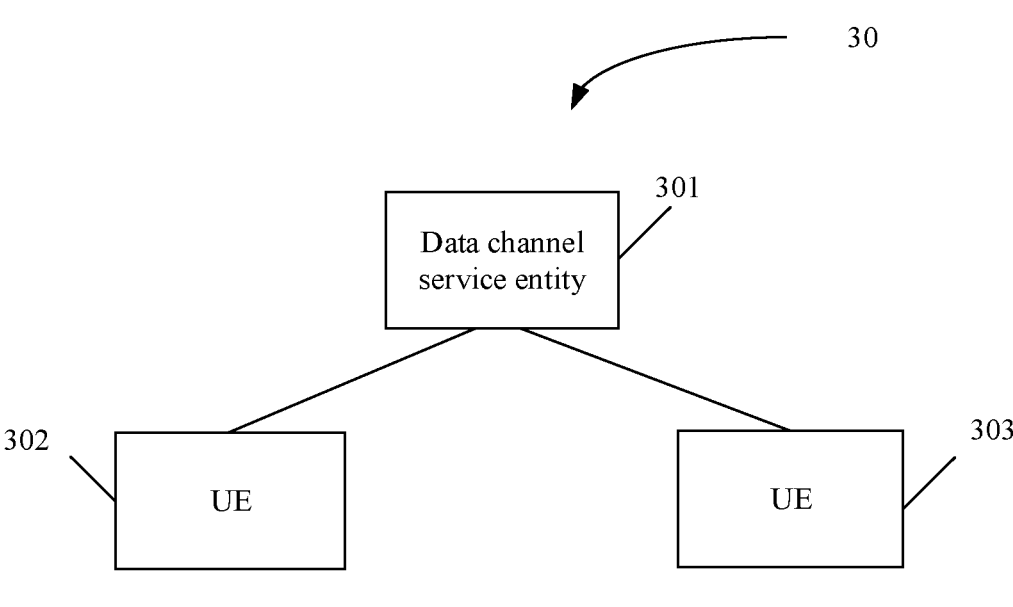
FIG. 3A is a schematic diagram of an architecture of a communication system according to an embodiment of this disclosure.

FIG. 3A is a schematic diagram of an architecture of the communication system 30 according to an embodiment of this disclosure. In FIG. 3A, the communication system 30 may include a data channel service entity 301, UE 302, and UE 303. The UE 302 and the UE 303 can communicate with the data channel service entity 301. FIG. 3A is merely a schematic diagram, and does not constitute a limitation on an applicable scenario of the technical solutions provided in this disclosure.

In FIG. 3A, the data channel service entity 301 may be configured to transmit real-time interaction information between the UE 302 and the UE 303 that are in a same call service. Further, the data channel service entity 301 may establish a first data channel with the UE 302 and establish a first video channel with the UE 303. The first video channel is used to transmit data according to UDP. To be specific, the first video channel is a logical channel or a data connection for transmitting data according to UDP. The data channel service entity 301 may send, to the UE 303 through the first video channel, first real-time interaction information sent by the UE 302 through the first data channel, and/or send, to the UE 302 through the first data channel, second real-time interaction information sent by the UE 303 through the first video channel. The data channel service entity 301 may further establish a second data channel with the UE 302 and establish a second video channel with the UE 303. The second video channel is used to transmit data according to UDP. The data channel service entity 301 may send, to the UE 303 through the second video channel, RTCP data sent by the UE 302 through the second data channel, and/or send, to the UE 302 through the second data channel, RTCP data sent by the UE 303 through the second video channel. In this way, real-time interaction can be implemented between a user of UE (for example, the UE 302) that establishes a data channel and a user of UE that fails to establish a data channel (for example, the UE 303, where the UE 303 may fail to establish a data channel because the UE 303 does not support establishment of the data channel, or although the UE 303 may support establishment of a data channel but fails to establish the data channel due to specific reason, for example, a limitation of network resources) in a call service, or real-time interaction can be implemented between a user of UE that supports establishment of a data channel and a user of UE that does not support establishment of a data channel in a call service. This process is described in the following methods shown in FIG. 7 and FIG. 10.

In this embodiment of this disclosure, a function of the data channel service entity may be provided by one network element, or may be jointly provided by a plurality of network elements. In other words, the function of the data channel service entity may be deployed on one network element, or may be deployed on a plurality of network elements, to enable the plurality of network elements to jointly implement the function of the data channel service entity.

The data channel service entity 301 is used as an example. The function of the data channel service entity 301 may be provided by an IMS application server (AS). Alternatively, the function of the data channel service entity 301 may be jointly provided by an IMS AS, a data channel server control plane (DCS-C), and a data channel server-media plane (DCS-M). For example, the data channel service entity in this embodiment of this disclosure may be a data channel service subsystem (DCSS) defined in a 3GPP standard specification. For details, refer to an embodiment corresponding to FIG. 10.

In the communication system 30 shown in FIG. 3A, media (for example, real-time interaction information and/or audio and video media content) of the UEs is not anchored to an IMS access media gateway (AGW), that is, the IMS AGW is not included in a communication path between the UE 302 and the UE 303. During actual application, the media of the UEs may alternatively be anchored to the IMS AGW, that is, the IMS AGW is included in a communication path of two UEs that are in a same call service. It may be understood that each UE in the call service may have a corresponding IMS AGW. In this way, based on whether media of the UE is anchored to the IMS AGW corresponding to the UE, the communication system may be deployed in the following three manners.

Figure 3B:
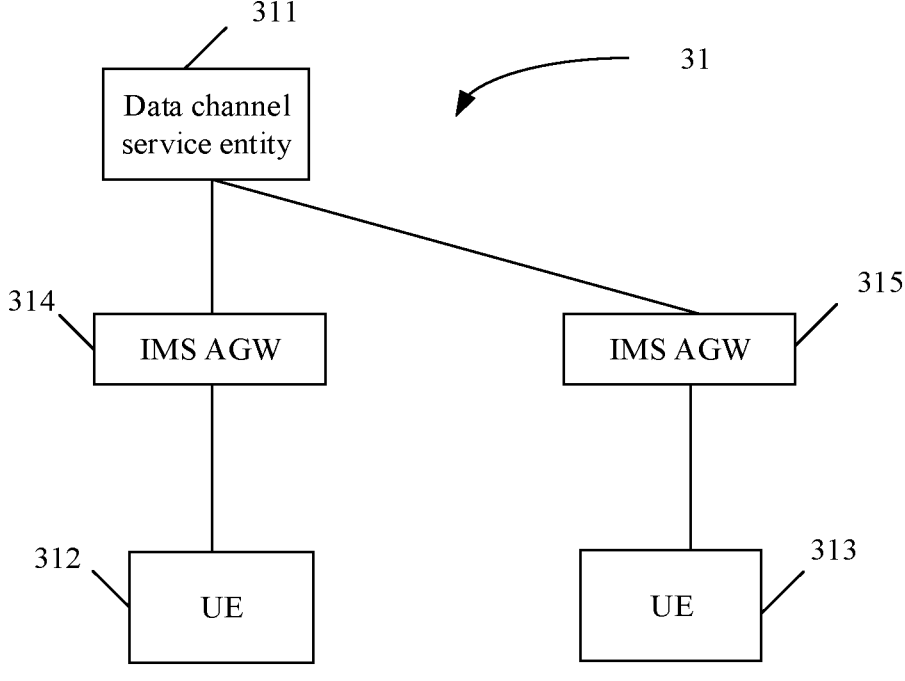
FIG. 3B is a schematic diagram of an architecture of a communication system according to an embodiment of this disclosure.

Deployment manner 1: Media of UE 1 is anchored to an IMS AGW corresponding to the UE 1, and media of UE 2 is anchored to an IMS AGW corresponding to the UE 2, as shown in FIG. 3B.

Deployment manner 2: Media of UE 1 is anchored to an IMS AGW corresponding to the UE 1, but media of UE 2 is not anchored to an IMS AGW corresponding to the UE 2.

Deployment manner 3: Media of UE 1 is not anchored to an IMS AGW corresponding to the UE 1, but media of UE 2 is anchored to an IMS AGW corresponding to the UE 2.

The following describes a communication system in a media anchored scenario by using the deployment manner 1 as an example. It may be understood that a case in which media of UE is anchored to an IMS AGW in the following embodiments of this disclosure is described by using the deployment manner 1 as an example. The case in which media of UE is anchored to an IMS AGW in the deployment manner 2 or the deployment manner 3 is similar to the case in which media of UE is anchored to an IMS AGW in the deployment manner 1. Therefore, for details, refer to the case in which media of UE is anchored to an IMS AGW in the deployment manner 1. The details are not described again.

FIG. 3B is a schematic diagram of an architecture of the communication system 31 according to an embodiment of this disclosure. In FIG. 3B, the communication system 31 may include a data channel service entity 311, an IMS AGW 314 and an IMS AGW 315 that can communicate with the data channel service entity 311, UE 312 that can communicate with the IMS AGW 314, and UE 313 that can communicate with the IMS AGW 315. FIG. 3B is merely a schematic diagram, and does not constitute a limitation on an applicable scenario of the technical solutions provided in this disclosure.

In this embodiment of this disclosure, an IMS AGW may be configured to forward a message or data between the data channel service entity and UE, or between UEs that are in a same call service. For example, the IMS AGW 314 may be configured to forward a message or data between the data channel service entity 311 and the UE 312, or between the UE 312 and the UE 313. The IMS AGW 315 may be configured to forward a message or data between the data channel service entity 311 and the UE 313, or between the UE 312 and the UE 313. For descriptions of the data channel service entity 311, refer to the descriptions of the data channel service entity in FIG. 3A. Details are not described herein again.

It may be understood that, in this embodiment of this disclosure, an audio channel is established when a speech call is made between UEs, and an audio channel and a video channel are established when a video call is made between UEs. In a scenario in which media of UE is not anchored to an IMS AGW, an audio channel established when a speech call is made between UEs may be shown in FIG. 4A, and an audio channel and a video channel that are established when a video call is made between UEs may be shown in FIG. 4B. In a scenario in which media of UE is anchored to an IMS AGW, an audio channel established when a speech call is made between UEs may be shown in FIG. 4C, and an audio channel and a video channel that are established when a video call is made between UEs may be shown in FIG. 4D.

Figure 4A:
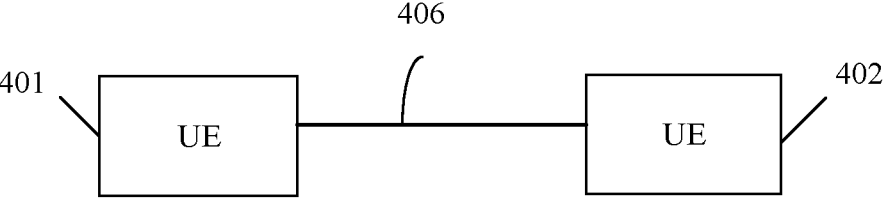
FIG. 4A is a schematic diagram of an audio channel according to an embodiment of this disclosure.

In FIG. 4A, UE 401 may establish an audio channel 406 with UE 402. The audio channel 406 does not pass through an IMS AGW. In other words, a communication path in which the audio channel 406 is located does not include an IMS AGW. The UE 401 and the UE 402 may transmit audio information through the audio channel 406.

Figure 4B:
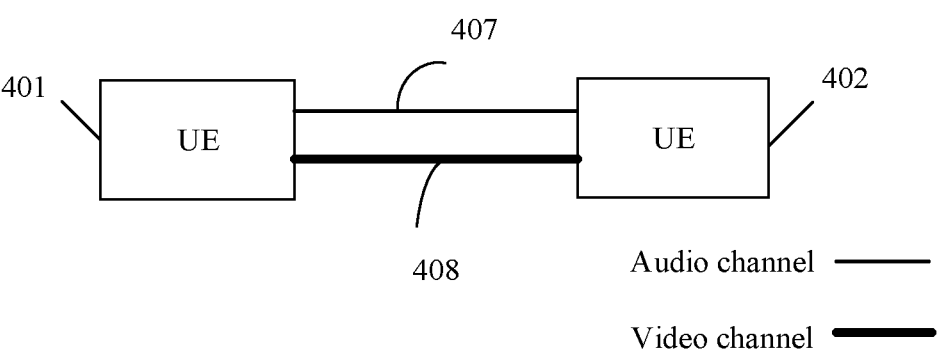
FIG. 4B is a schematic diagram of an audio channel and a video channel according to an embodiment of this disclosure.

In FIG. 4B, the UE 401 may establish an audio channel 407 and a video channel 408 with the UE 402. The audio channel 407 and the video channel 408 do not pass through an IMS AGW. In other words, a communication path in which the audio channel 407 is located does not include an IMS AGW, and a communication path in which the video channel 408 is located does not include an IMS AGW either.

The UE 401 and the UE 402 may transmit audio information through the audio channel 407, and transmit video information through the video channel 408.

Figure 4C:
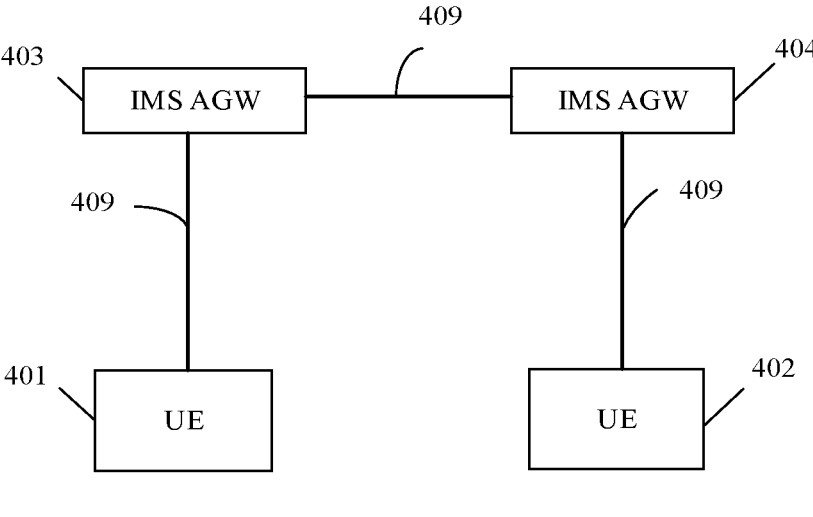
FIG. 4C is a schematic diagram of an audio channel according to an embodiment of this disclosure.

In FIG. 4C, the UE 401 may establish an audio channel 409 with the UE 402. The audio channel 409 passes through an IMS AGW 403 corresponding to the UE 401 and an IMS AGW 404 corresponding to the UE 402. In other words, a communication path in which the audio channel 409 is located includes the IMS AGW 403 and the IMS AGW 404. The UE 401 and the UE 402 may transmit audio information through the audio channel 409.

Figure 4D:
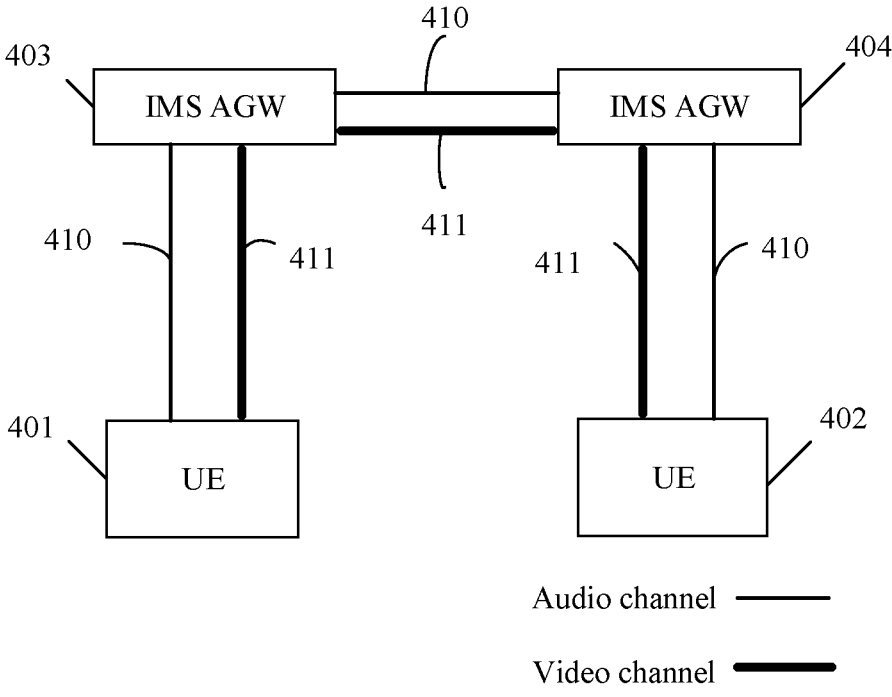
FIG. 4D is a schematic diagram of an audio channel and a video channel according to an embodiment of this disclosure.

In FIG. 4D, the UE 401 may establish an audio channel 410 and a video channel 411 with the UE 402. The audio channel 410 and the video channel 411 pass through the IMS AGW 403 corresponding to the UE 401 and the IMS AGW 404 corresponding to the UE 402. In other words, a communication path in which the audio channel 410 is located includes the IMS AGW 403 and the IMS AGW 404, and a communication path in which the video channel 411 is located includes the IMS AGW 403 and the IMS AGW 404. The UE 401 and the UE 402 may transmit audio information through the audio channel 410, and transmit video information through the video channel 411.

In a process of making a speech call or a video call between the UE 401 and the UE 402, to transmit real-time interaction information between the two UEs, there are the following two options.

Option 1: A data channel service entity 405 establishes a data channel with the UE 401, and establishes a video channel with the UE 402. The data channel service entity 405 implements transmission of real-time interaction information between the two UEs through data format conversion.

Figure 5A:
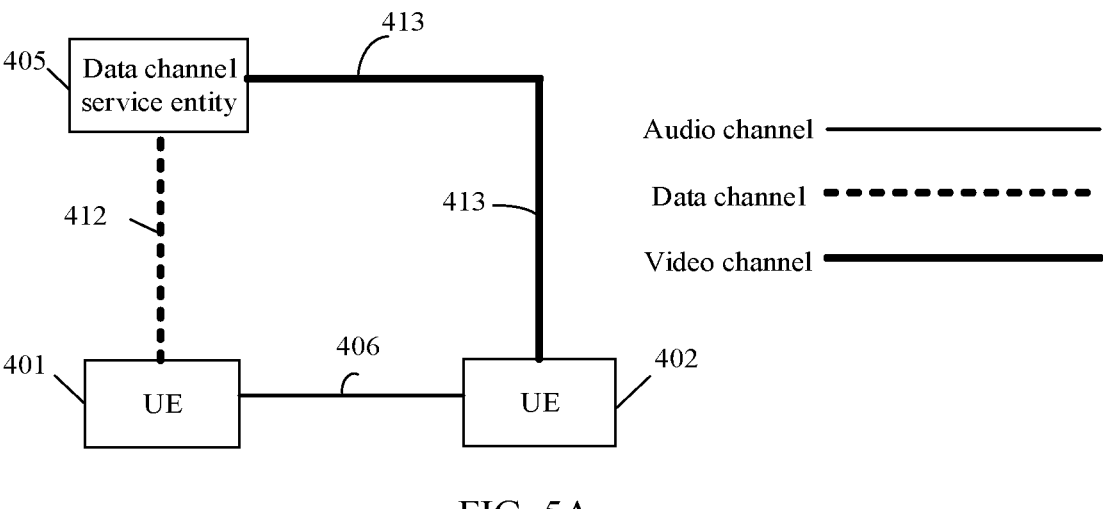
FIG. 5A is a schematic diagram of an audio channel, a video channel, and a data channel according to an embodiment of this disclosure.

For example, for FIG. 4A, a data channel and a video channel that are established by the data channel service entity 405 may be shown in FIG. 5A. In FIG. 5A, the data channel service entity 405 establishes a data channel 412 with the UE 401, and establishes a video channel 413 with the UE 402. The data channel 412 and the video channel 413 do not pass through an IMS AGW. In other words, a communication path in which the data channel 412 is located does not include an IMS AGW, and a communication path in which the video channel 413 is located does not include an IMS AGW either. The UE 401 and the data channel service entity 405 may transmit data according to SCTP through the data channel 412. The data channel service entity 405 and the UE 402 transmit data according to UDP through the video channel 413. In an example, the data channel 412 may include a first data channel in the following embodiments of this disclosure. Optionally, the data channel 412 may further include a second data channel, and/or a third data channel, and/or a fourth data channel, and/or a second signaling application data channel in the following embodiments of this disclosure. The video channel 413 may include a first video channel in the following embodiments of this disclosure. Optionally, the video channel 413 may further include a second video channel in the following embodiments of this disclosure. It may be understood that the data channel service entity 405 may also establish an audio channel with the UE 401, and establish an audio channel with the UE 402. In this case, the audio information sent by the UE 401 is not transmitted through the audio channel 406 originally established in FIG. 4A, but is forwarded to the UE 402 through the data channel service entity 405. Similarly, the audio information sent by the UE 402 is not transmitted through the audio channel 406 originally established in FIG. 4A, but is forwarded to the UE 401 through the data channel service entity 405.

Figure 5B:
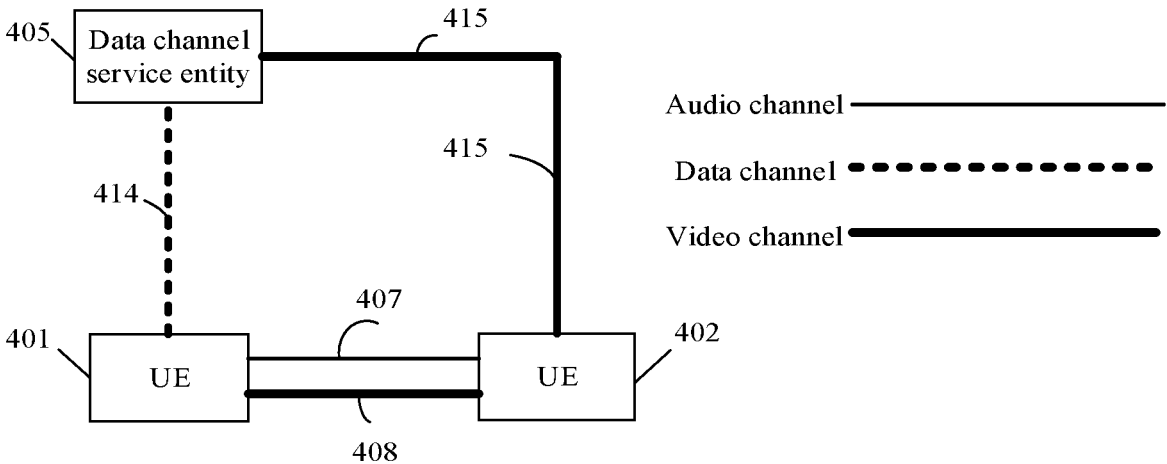
FIG. 5B is a schematic diagram of an audio channel, a video channel, and a data channel according to an embodiment of this disclosure.

For example, for FIG. 4B, a data channel and a video channel that are established by the data channel service entity 405 may be shown in FIG. 5B. In FIG. 5B, the data channel service entity 405 establishes a data channel 414 with the UE 401, and establishes a video channel 415 with the UE 402. The data channel 414 and the video channel 415 do not pass through an IMS AGW. In other words, a communication path in which the data channel 414 is located does not include an IMS AGW, and a communication path in which the video channel 415 is located does not include an IMS AGW either. The UE 401 and the data channel service entity 405 may transmit data according to SCTP through the data channel 414. The data channel service entity 405 and the UE 402 transmit data according to UDP through the video channel 415. In an example, the data channel 414 may include a first data channel in the following embodiments of this disclosure. Optionally, the data channel 414 may further include a second data channel, and/or a third data channel, and/or a fourth data channel, and/or a second signaling application data channel in the following embodiments of this disclosure. The video channel 415 may include a first video channel in the following embodiments of this disclosure. The video channel 415 may further include a second video channel in the following embodiments of this disclosure. It may be understood that the video channel 408 originally established in FIG. 4B may or may not be removed. If the video channel 408 is not removed, the UE 401 may still send video information (for example, video information shot by a camera of the UE 401) through the video channel 408, but the UE 402 does not receive the video information, or the UE 402 receives the video information but does not process the video information. It may be understood that the data channel service entity 405 may also establish an audio channel (not shown in FIG. 5B) with the UE 401, and establish an audio channel (not shown in FIG. 5B) with the UE 402. In this case, the audio information sent by the UE 401 is not transmitted through the audio channel 407 originally established in FIG. 4B, but is forwarded to the UE 402 through the data channel service entity 405. Similarly, the audio information sent by the UE 402 is not transmitted through the audio channel 407 originally established in FIG. 4B, but is forwarded to the UE 401 through the data channel service entity 405.

Figure 5C:
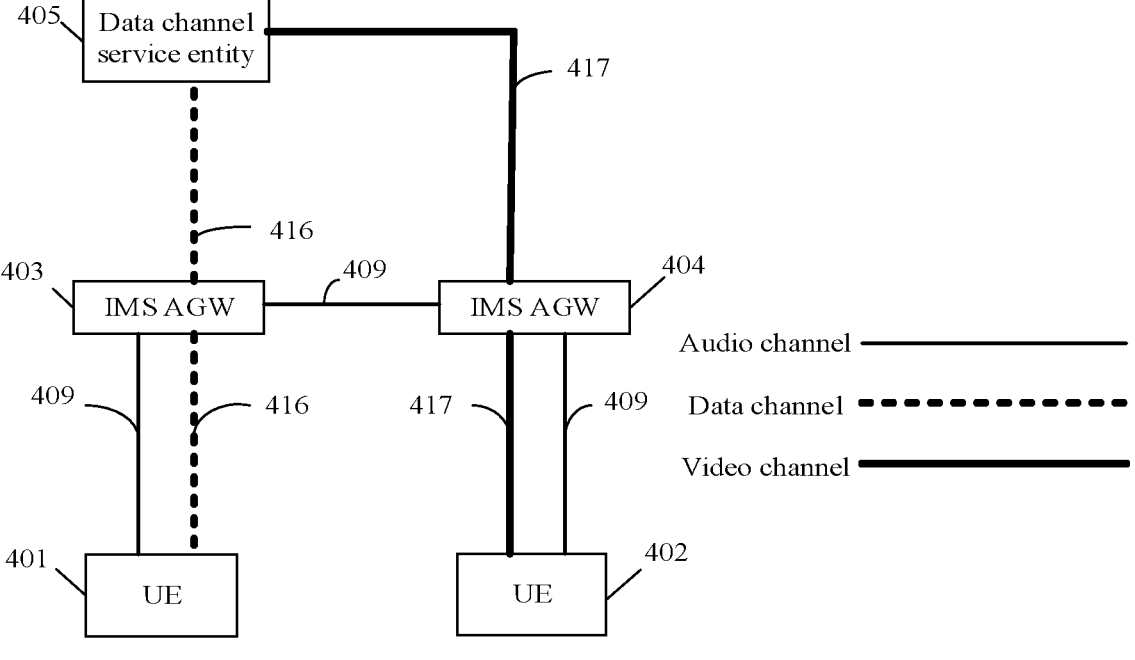
FIG. 5C is a schematic diagram of an audio channel, a video channel, and a data channel according to an embodiment of this disclosure.

For example, for FIG. 4C, a data channel and a video channel that are established by the data channel service entity 405 may be shown in FIG. 5C. In FIG. 5C, the data channel service entity 405 establishes a data channel 416 with the UE 401, and establishes a video channel 417 with the UE 402. The data channel 416 and the video channel 417 pass through an IMS AGW. In other words, a communication path in which the data channel 416 is located includes the IMS AGW 403, and a communication path in which the video channel 417 is located includes the IMS AGW 404. The UE 401 and the data channel service entity 405 may transmit data according to SCTP through the data channel 416. The data channel service entity 405 and the UE 402 transmit data according to UDP through the video channel 417. In an example, the data channel 416 may include a first data channel in the following embodiments of this disclosure. Optionally, the data channel 416 may further include a second data channel, and/or a third data channel, and/or a fourth data channel, and/or a second signaling application data channel in the following embodiments of this disclosure. The video channel 417 may include a first video channel in the following embodiments of this disclosure.

Optionally, the video channel 417 may further include a second video channel in the following embodiments of this disclosure. It may be understood that the data channel service entity 405 may also establish an audio channel with the IMS AGW 403, and establish an audio channel with the IMS AGW 404. In this case, the audio information sent by the UE 401 may reach the data channel service entity 405 through the IMS AGW 403, and then the data channel service entity 405 forwards the audio information to the UE 402 through the IMS AGW 404. Similarly, the audio information sent by the UE 402 may reach the data channel service entity 405 through the IMS AGW 404, and then the data channel service entity 405 forwards the audio information to the UE 401 through the IMS AGW 403.

Figures 5D, 6:
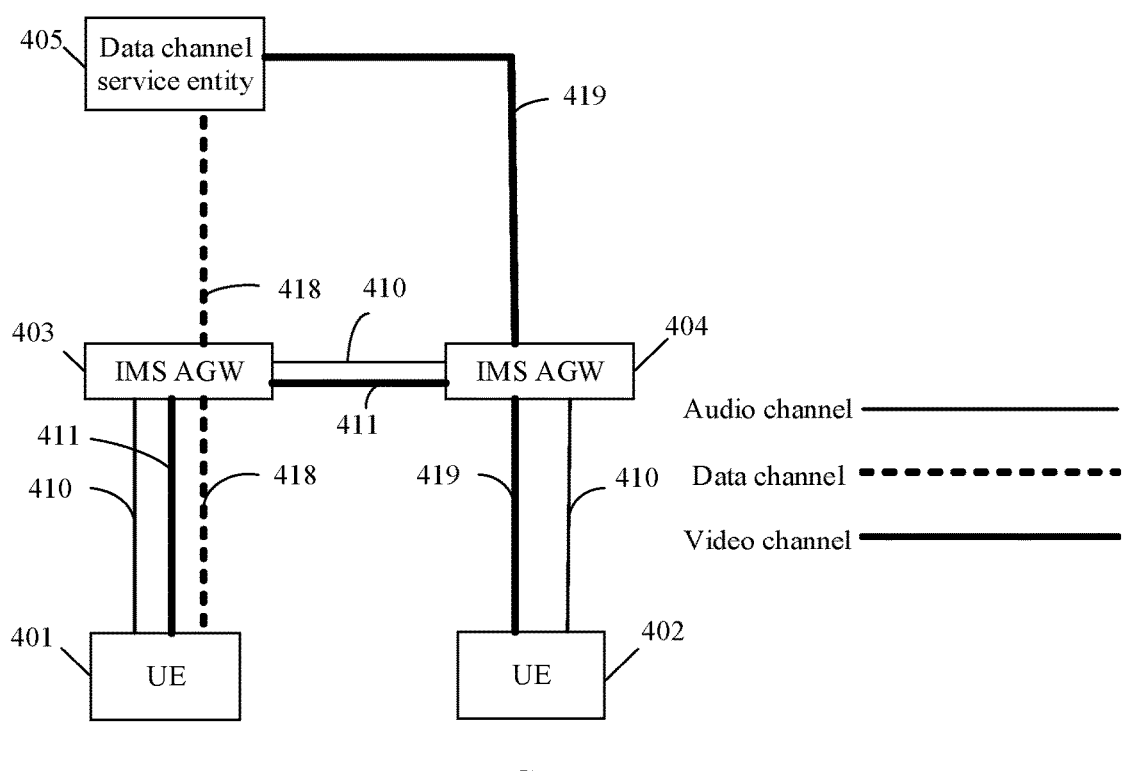
FIG. 5D is a schematic diagram of an audio channel, a video channel, and a data channel according to an embodiment of this disclosure.
FIG. 6 is a schematic diagram of a hardware structure of a communication apparatus according to an embodiment of this disclosure.

For example, for FIG. 4D, a data channel and a video channel that are established by the data channel service entity 405 may be shown in FIG. 5D. In FIG. 5D, the data channel service entity 405 establishes a data channel 418 with the UE 401, and establishes a video channel 419 with the IMS AGW 404. The data channel 418 and the video channel 419 pass through an IMS AGW. In other words, a communication path in which the data channel 418 is located includes the IMS AGW 403, and a communication path in which the video channel 419 is located includes the IMS AGW 404. The UE 401 and the data channel service entity 405 may transmit data according to SCTP through the data channel 418. The data channel service entity 405 and the UE 402 transmit data according to UDP through the video channel 419. In an example, the data channel 418 may include a first data channel in the following embodiments of this disclosure. Optionally, the data channel 418 may further include a second data channel, and/or a third data channel, and/or a fourth data channel, and/or a second signaling application data channel in the following embodiments of this disclosure. The video channel 419 may include a first video channel in the following embodiments of this disclosure. Optionally, the video channel 419 may further include a second video channel in the following embodiments of this disclosure. It may be understood that the data channel service entity 405 may also establish an audio channel with the IMS AGW 403, and establish an audio channel with the IMS AGW 404. In this case, the audio information sent by the UE 401 may reach the data channel service entity 405 through the IMS AGW 403, and then the data channel service entity 405 forwards the audio information to the UE 402 through the IMS AGW 404. Similarly, the audio information sent by the UE 402 may reach the data channel service entity 405 through the IMS AGW 404, and then the data channel service entity 405 forwards the audio information to the UE 401 through the IMS AGW 403. It may be understood that the video channel 411 originally established in FIG. 4D may or may not be removed. If the video channel 411 is not removed, the UE 401 may still send video information (for example, video information shot by a camera of the UE 401) through the video channel 411, but the IMS AGW 404 does not receive the video information, or the IMS AGW 404 receives the video information but does not process the video information.

Option 2: An end-to-end data channel is established between the two UEs, and real-time interaction information is directly transmitted without being forwarded by the data channel service entity 405.

For example, if real-time interaction information needs to be transmitted in a process of making a speech call or a video call between the UE 401 and the UE 402, a data channel may be established between the UE 401 and the UE 402. The data channel may be used to transmit the real-time interaction information. For an audio channel and a video channel, refer to the corresponding descriptions in FIG. 5A, FIG. 5B, FIG. 5C, or FIG. 5D.

The communication system 30 shown in FIG. 3A and the communication system 31 shown in FIG. 3B are merely used as examples, and are not intended to limit the technical solutions of this disclosure. A person skilled in the art may understand that, in a specific implementation process, the communication system 30 or the communication system 31 may further include another device. In addition, a quantity of UEs, data channel service entities, or IMS AGWs may also be determined based on a specific requirement. This is not limited.

Optionally, each network element or device (for example, the UE or the data channel service entity) in FIG. 3A or FIG. 3B in embodiments of this disclosure may also be referred to as a communication apparatus, and may be a general-purpose device or a dedicated device. This is not limited in embodiments of this disclosure.

Optionally, related functions of each network element or device (for example, the UE or the data channel service entity) in FIG. 3A or FIG. 3B in embodiments of this disclosure may be implemented by one device, or may be jointly implemented by a plurality of devices, or may be implemented by one or more functional modules in one device. This is not further limited in embodiments of this disclosure. It may be understood that the foregoing functions may be network elements in a hardware device, or may be software functions running on dedicated hardware, a combination of hardware and software, or virtualized functions instantiated on a platform (for example, a cloud platform).

During specific implementation, each device or network element (for example, the UE or the data channel service entity) shown in FIG. 3A or FIG. 3B may use a composition structure shown in FIG. 6, or include components shown in FIG. 6. FIG. 6 is a schematic diagram of a hardware structure of a communication apparatus applicable to an embodiment of this disclosure. The communication apparatus 60 includes at least one processor 601 and at least one communication interface 604, and is configured to implement the method provided in embodiments of this disclosure. The communication apparatus 60 may further include a communication line 602 and a memory 603.

The processor 601 may be a general-purpose central processing unit (CPU), a microprocessor, an application-specific integrated circuit (ASIC), or one or more integrated circuits configured to control program execution of the solutions in this disclosure.

The communication line 602 may include a path, for example, a bus, for transmitting information between the foregoing components.

The communication interface 604 is configured to communicate with another device or a communication network. The communication interface 604 may be any apparatus such as a transceiver, for example, may be an Ethernet interface, a radio access network (RAN) interface, a wireless local area network (WLAN) interface, a transceiver, a pin, a bus, or a transceiver circuit.

The memory 603 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM (CD-ROM) or other CD storage, an optical disc storage (including a compact optical disc, a laser disc, an optical disc, a DIGITAL VERSATILE DISC (DVD), a BLU-RAY disc, and the like), a magnetic disk storage medium or another magnetic storage device, or any other medium that can be configured to carry or store expected program code in a form of an instruction structure or a data structure and that can be accessed by a computer. However, the memory 603 is not limited thereto. The memory may exist independently, and is coupled to the processor 601 through the communication line 602. The memory 603 may alternatively be integrated with the processor 601. The memory provided in this embodiment of this disclosure may be usually non-volatile.

The memory 603 is configured to store computer-executable instructions for executing solutions provided in embodiments of this disclosure, and the processor 601 controls execution. The processor 601 is configured to execute the computer-executable instructions stored in the memory 603, to implement the method provided in embodiments of this disclosure. Alternatively, optionally, in this embodiment of this disclosure, the processor 601 may perform processing-related functions in the method provided in the following embodiments of this disclosure, and the communication interface 604 is responsible for communicating with another device or a communication network. This is not limited in this embodiment of this disclosure.

Optionally, the computer-executable instructions in this embodiment of this disclosure may also be referred to as application code. This is not limited in this embodiment of this disclosure.

The coupling in this embodiment of this disclosure may be an indirect coupling or a communication connection between apparatuses, units, or modules in an electrical form, a mechanical form, or another form, and is used for information exchange between the apparatuses, the units, or the modules.

In an embodiment, the processor 601 may include one or more CPUs, for example, a CPU 0 and a CPU 1 in FIG. 6.

In an embodiment, the communication apparatus 60 may include a plurality of processors, for example, the processor 601 and a processor 607 in FIG. 6. Each of the processors may be a single-core processor (single-CPU), or may be a multi-core processor (multi-CPU). The processor herein may be one or more devices, circuits, and/or processing cores configured to process data (for example, computer program instructions).

In an embodiment, the communication apparatus 60 may further include an output device 605 and/or an input device 606. The output device 605 is coupled to the processor 601, and may display information in a plurality of manners. For example, the output device 605 may be a liquid-crystal display (LCD), a light-emitting diode (LED) display device, a cathode-ray tube (CRT) display device, a projector, or the like. The input device 606 is coupled to the processor 601, and may receive an input of a user in a plurality of manners. For example, the input device 606 may be a mouse, a keyboard, a touchscreen device, a sensing device, or the like.

It may be understood that the composition structure shown in FIG. 6 does not constitute a limitation on the communication apparatus. In addition to the components shown in FIG. 6, the communication apparatus may include more or fewer components than those shown in the figure, combine some components, or have different component arrangements.

The following describes the method provided in embodiments of this disclosure with reference to the accompanying drawings. Network elements in the following embodiments may have the components shown in FIG. 6. Details are not described again.

It may be understood that, in embodiments of this disclosure, "transmit" may be understood as "send and/or receive" based on a specific context. "Transmit" can be a noun or a verb. When an execution body of an action is not emphasized, "transmit" is often used instead of "send and/or receive". For example, a phrase "transmit real-time interaction information" may be understood as "send real-time interaction information" from a perspective of sender UE, or may be understood as "receive real-time interaction information" from a perspective of receiver UE.

It may be understood that names of messages between network elements, names of parameters in the messages, or the like in the following embodiments of this disclosure are merely examples, and there may be other names during specific implementation. This is not limited in embodiments of this disclosure.

It may be understood that, in embodiments of this disclosure, "/" may indicate an "or" relationship between associated objects. For example, A/B may indicate A or B. The term "and/or" may be used to indicate that there are three relationships between associated objects. For example, A and/or B may indicate the following three cases: only A exists, both A and B exist, and only B exists, where A and B may be singular or plural. In addition, an expression similar to "at least one of A, B, and C" or "at least one of A, B, or C" is usually used to indicate any one of the following: only A exists, only B exists, only C exists, both A and B exist, both A and C exist, both B and C exist, and all A, B, and C exist. The foregoing uses three elements A, B, and C as an example to describe the optional items of the project. When there are more elements in an expression, the meaning of the expression may be obtained according to the foregoing rules.

To facilitate description of the technical solutions in embodiments of this disclosure, in embodiments of this disclosure, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this disclosure, the term such as "example" or "for example" is used to represent an example, an illustration, or a description. Any embodiment or design scheme described with "example" or "for example" cannot be explained as being more preferred or having more advantages than another embodiment or design scheme. Use of the term such as "example" or "for example" is intended to present a related concept in a specific manner for ease of understanding.

It may be understood that "an embodiment" mentioned throughout this specification means that particular features, structures, or characteristics related to the embodiment are included in at least one embodiment of this disclosure. Therefore, embodiments throughout this specification do not necessarily refer to a same embodiment. In addition, these particular features, structures, or characteristics may be combined in one or more embodiments in any proper manner. It may be understood that sequence numbers of processes do not mean execution sequences in embodiments of this disclosure. The execution sequences of the processes can be determined based on functions and internal logic of the processes, and cannot be construed as any limitation on implementation processes of embodiments of this disclosure.

It may be understood that, in this disclosure, "when" and "if" mean that corresponding processing is performed in an objective situation, and are not intended to limit time. The terms do not mean that a determining action is required during implementation, and do not mean any other limitation.

"Simultaneously" in this disclosure may be understood as being at a same time point, may be understood as being within a time period, or may be understood as being within a same cycle.

It may be understood that, in some scenarios, some optional features in embodiments of this disclosure may be independently implemented without depending on another feature, for example, a solution on which the optional features are currently based, to resolve a corresponding technical problem and achieve corresponding effect. Alternatively, in some scenarios, the optional features may be combined with another feature based on a requirement. Correspondingly, the apparatus provided in this embodiment of this disclosure may also implement these features or functions. Details are not described herein.

It may be understood that a same step or a step or a technical feature having a same function in embodiments of this disclosure may be mutually referenced in different embodiments.

It may be understood that, in embodiments of this disclosure, the UE or the data channel service entity may perform some or all of steps in embodiments of this disclosure. The steps are merely examples. In embodiments of this disclosure, another step or a variation of various steps may be further performed. In addition, the steps may be performed in a sequence different from a sequence presented in embodiments of this disclosure, and possibly, not all the steps in embodiments of this disclosure need to be performed.

Figure 7:
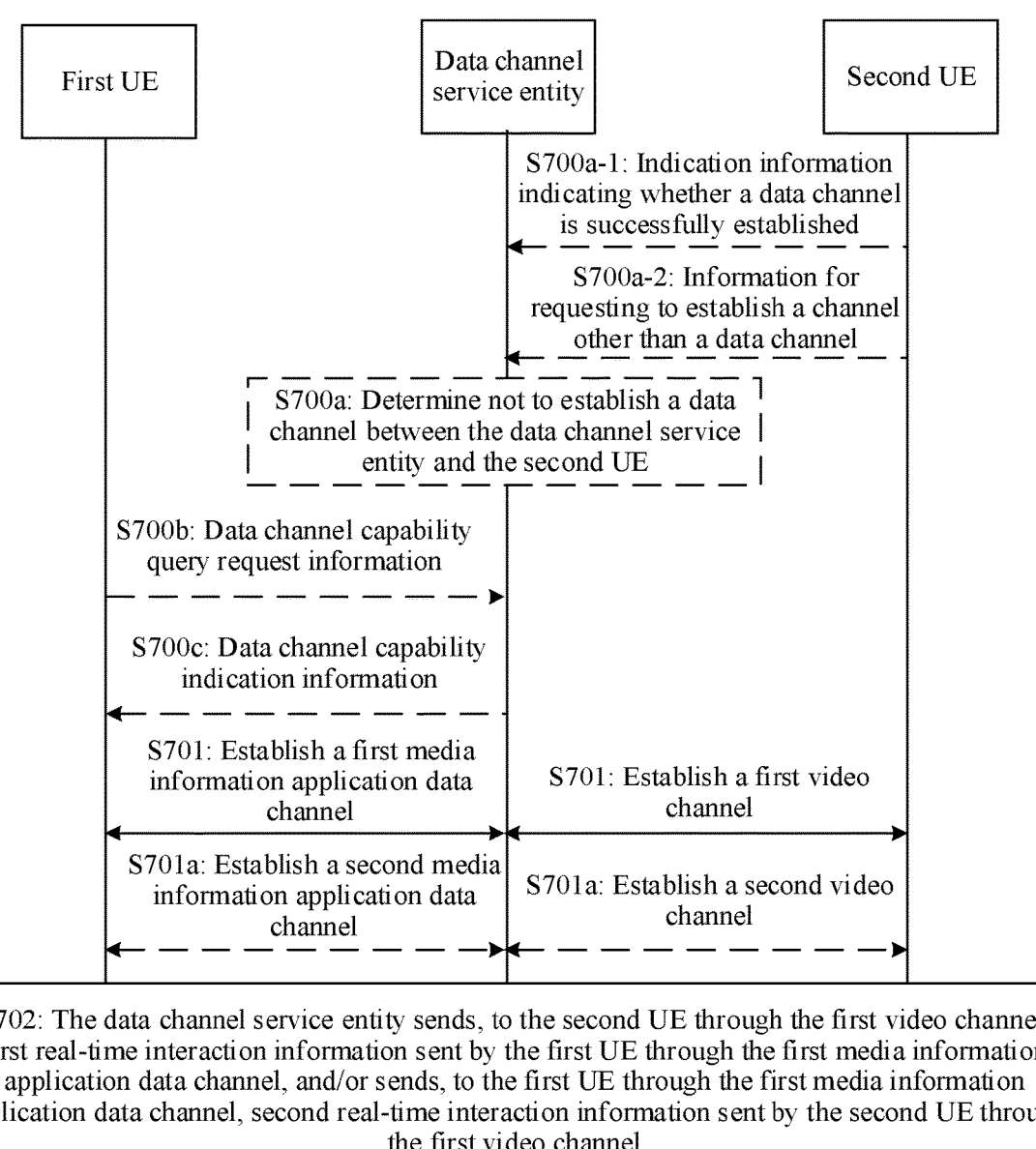
FIG. 7 is a schematic flowchart of a communication method according to an embodiment of this disclosure.

FIG. 7 shows a communication method according to an embodiment of this disclosure. The communication method is implemented based on FIG. 3A, FIG. 3B, FIG. 5A, FIG. 5B, FIG. 5C, FIG. 5D, and the like. For example, a data channel service entity in the method shown in FIG. 7 is the data channel service entity 301, first UE in the method shown in FIG. 7 is the UE 302, and second UE in the method shown in FIG. 7 is the UE 303. Alternatively, a data channel service entity in the method shown in FIG. 7 is the data channel service entity 311, first UE in the method shown in FIG. 7 is the UE 312, and second UE in the method shown in FIG. 7 is the UE 313. Alternatively, a data channel service entity in the method shown in FIG. 7 is the data channel service entity 405, first UE in the method shown in FIG. 7 is the UE 401, and second UE in the method shown in FIG. 7 is the UE 402. The communication method may include S701 and S702.

S701: The data channel service entity establishes a first media information application data channel with the first UE, and establishes a first video channel with the second UE. Correspondingly, the first UE establishes the first media information application data channel with the data channel service entity, and the second UE establishes the first video channel with the data channel service entity.

In this embodiment of this disclosure, the first UE is calling-party user equipment, and the second UE is called-party user equipment. Alternatively, the first UE is called-party user equipment, and the second UE is calling-party user equipment. Unified descriptions are provided herein, and details are not described below.

In S701, the first media information application data channel is used to transmit, according to SCTP, RTP data including real-time interaction information, and the first video channel is used to transmit, according to UDP, RTP data including real-time interaction information.

It may be understood that the data channel (for example, the first media information application data channel, a second media information application data channel, a bootstrap data channel, a first signaling application data channel, and/or a second signaling application data channel) in this embodiment of this disclosure may be a data channel that is between the data channel service entity and the first UE and that does not pass through an IMS AGW, or may be a data channel established by the data channel service entity with the first UE through an IMS AGW. Unified descriptions are provided herein, and details are not described below again.

For example, in the communication system 30 shown in FIG. 3A, the data channel service entity 301 may directly establish the first media information application data channel with the UE 302. For example, in the communication system 31 shown in FIG. 3B, the data channel service entity 311 may establish the first media information application data channel with the UE 312 through the IMS AGW 314. In this case, the real-time interaction information sent by the UE 312 is forwarded to the data channel service entity 311 through the IMS AGW 314, and the real-time interaction information sent by the data channel service entity 311 is forwarded to the UE 312 through the IMS AGW 314.

S702: The data channel service entity sends, to the second UE through the first video channel, first real-time interaction information sent by the first UE through the first media information application data channel, and/or sends, to the first UE through the first media information application data channel, second real-time interaction information sent by the second UE through the first video channel.

For descriptions of the real-time interaction information, refer to the foregoing descriptions of the technical terms in embodiments of this disclosure. The first real-time interaction information may include at least one of the following: content shot by a camera, information generated by a thumbs-up, desktop sharing content, a mark drawn by a user on a screen, a text message, picture information, geographical location information, or video content in a video file. The second real-time interaction information may include content shot by a camera.

Figures 8, 9A:
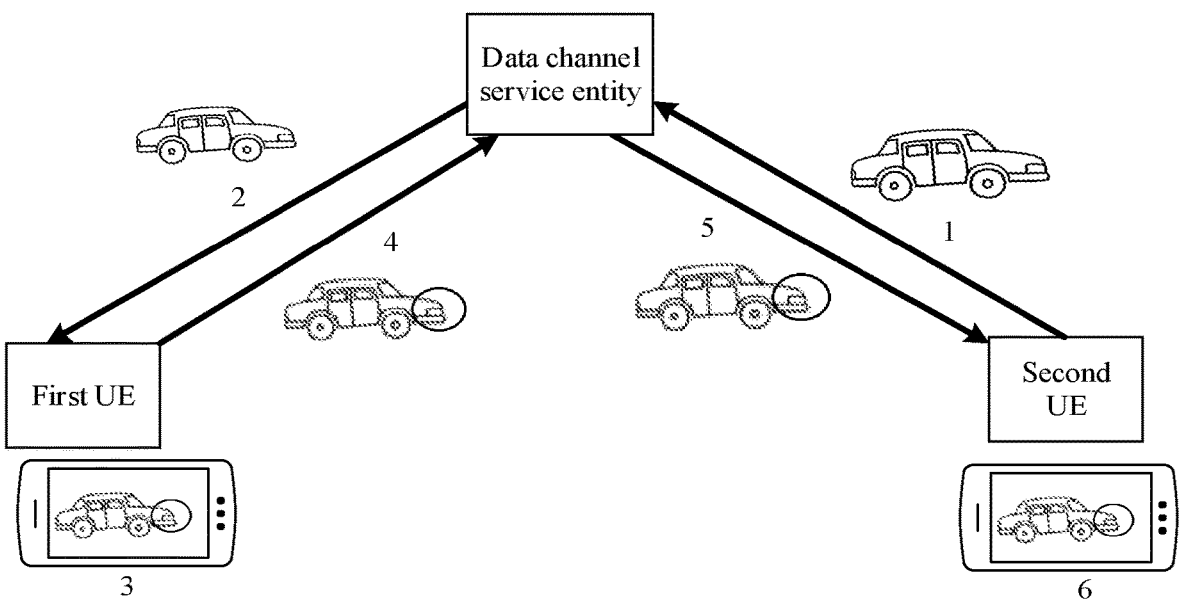
FIG. 8 is a schematic diagram of transmitting real-time interaction information according to an embodiment of this disclosure.
FIG. 9A is a schematic diagram of a data channel data packet and a video channel data packet according to an embodiment of this disclosure.

In an example, as shown in FIG. 8, the second UE sends a shot vehicle image to the data channel service entity through the first video channel. After receiving the image, the data channel service entity sends the image to the first UE through the first media information application data channel. After receiving the image, the first UE may display a vehicle on a display of the first UE. A user of the first UE may further draw a mark on the image of the vehicle, so that the first UE sends mark data (namely, data generated by the first UE for the mark) to the data channel service entity through the first media information application data channel. After receiving the mark data, the data channel service entity may send the mark data to the second UE through the first video channel. After receiving the mark data, the second UE may display the corresponding mark on the vehicle displayed on a display. In this example, the mark drawn by the user of the first UE is a type of real-time interaction information.

It may be understood that, in addition to the real-time interaction information, the data channel service entity may further send, to the second UE through the first video channel, audio and video exchange content sent by the first UE through the first media information application data channel, and/or send, to the first UE through the first media information application data channel, audio and video exchange content sent by the second UE through the first video channel.

In a possible implementation, that the data channel service entity sends, to the second UE through the first video channel, first real-time interaction information sent by the first UE through the first media information application data channel includes the following. The data channel service entity receives first RTP data from the first UE through the first media information application data channel, and sends the first RTP data to the second UE through the first video channel.

The first RTP data includes the first real-time interaction information. In other words, the first real-time interaction information is superimposed in a video frame, and then data of the video frame in which the first real-time interaction information is superimposed is transmitted through an RTP data packet. Unified descriptions are provided herein, and details are not described below again.

It may be understood that, in this embodiment of this disclosure, after receiving the first RTP data, the second UE may present the first real-time interaction information based on the first RTP data. For example, if the first real-time interaction information includes a mark drawn by the user on a screen, the second user equipment presents the mark on a screen of the second user equipment.

In a possible implementation, that the data channel service entity sends, to the first UE through the first media information application data channel, second real-time interaction information sent by the second UE through the first video channel includes the following. The data channel service entity receives second RTP data from the second UE through the first video channel, and sends the second RTP data to the first UE through the first media information application data channel, where the second RTP data includes the second real-time interaction information. That the second RTP data includes the second real-time interaction information has a similar meaning with that the first RTP data includes the first real-time interaction information. For details, refer to the descriptions of that the first RTP data includes the first real-time interaction information in this embodiment of this disclosure.

It may be understood that, in this embodiment of this disclosure, after receiving the second RTP data, the first UE may present the second real-time interaction information based on the second RTP data. For example, if the second real-time interaction information includes content shot by a camera of the second UE, the first user equipment presents the content on a screen of the first user equipment.

In this embodiment of this disclosure, a data packet transmitted through the first media information application data channel may be referred to as a data channel data packet, and a data packet transmitted through the first video channel may be referred to as a video channel data packet. The data channel data packet includes RTP data, and the RTP data includes real-time interaction information. The video channel data packet includes RTP data, and the RTP data includes real-time interaction information.

In S702, a datagram protocol used for the data channel data packet is different from a datagram protocol used for the video channel data packet. To be specific, after receiving a data channel data packet from the first UE, the data channel service entity may parse the data channel data packet to obtain RTP data, encapsulate the RTP data into a video channel data packet, and send the video channel data packet to the second UE. Similarly, after receiving a video channel data packet from the second UE, the data channel service entity may parse the video channel data packet to obtain RTP data, encapsulate the RTP data into a data channel data packet, and send the data channel data packet to the first UE.

For example, when the first UE sends RTP data to the second UE through the first media information application data channel, a data channel data packet and a video channel data packet may be shown in FIG. 9A. In FIG. 9A, the data channel data packet includes an IP header, a UDP header, a DTLS header, an SCTP header, and RTP data. The video channel data packet includes an IP header, a UDP header, and RTP data. After receiving the data channel data packet, the data channel service entity may separately remove the IP header, the UDP header, and the DTLS header, decrypt an obtained data packet, remove the SCTP header from a decrypted data packet to obtain the RTP data, add a UDP header and an IP header to the RTP data to obtain the video channel data packet, and then send the video channel data packet to the second UE through the first video channel. It may be understood that the foregoing DTLS header and decryption process are optional. If the foregoing DTLS header does not exist, the foregoing decryption process does not exist.

For example, when the second UE sends RTP data to the first UE through the first video channel, the video channel data packet includes an IP header, a UDP header, and second RTP data. The data channel data packet includes an IP header, a UDP header, a DTLS header, an SCTP header, and RTP data. After receiving the video channel data packet, the data channel service entity may separately remove the IP header and the UDP header to obtain the RTP data, add an SCTP header to the RTP data, encrypt the data packet to which the SCTP header is added, add a DTLS header, a UDP header, and an IP header to an encrypted data packet to obtain the data channel data packet, and then send the data channel data packet to the first UE through the first media information application data channel. It may be understood that the foregoing DTLS header and encryption process are also optional. If the foregoing encryption process does not exist, the foregoing DTLS header does not exist.

In a possible implementation, that the data channel service entity sends, to the second UE through the first video channel, first real-time interaction information sent by the first UE through the first media information application data channel includes the following. The data channel service entity receives the first real-time interaction information from the first UE through the first media information application data channel, and sends third RTP data to the second UE through the first video channel, where the third RTP data includes the first real-time interaction information. To be specific, the first UE may send the first real-time interaction information to the data channel service entity. After receiving the first real-time interaction information, the data channel service entity superimposes the first real-time interaction information into a video frame, and then sends, to the second UE through the third RTP data, data of the video frame in which the first real-time interaction information is superimposed. In this case, a size of the first real-time interaction information is smaller than that of the third RTP data. Therefore, traffic between the first UE and the data channel service entity can be saved.

It may be understood that, in this embodiment of this disclosure, after receiving the third RTP data, the second UE may present the first real-time interaction information based on the third RTP data. For example, if the first real-time interaction information includes a mark drawn by the user on a screen, the second user equipment presents the mark on a screen of the second user equipment.

In a possible implementation, that the data channel service entity sends, to the first UE through the first media information application data channel, second real-time interaction information sent by the second UE through the first video channel includes the following. The data channel service entity receives fourth RTP data from the second UE through the first video channel, extracts the second real-time interaction information from the fourth RTP data, and sends the second real-time interaction information to the first UE through the first media information application data channel.

In an example, that the data channel service entity extracts the second real-time interaction information from the fourth RTP data may be understood as follows. The data channel service entity extracts the second real-time interaction information through image recognition. For example, the fourth RTP data includes a video, and the video includes a nod action or an "OK" gesture of a user. The data channel service entity recognizes the nod or the "OK" gesture of the user by using an image recognition technology, and sends information indicating yes to the first UE. The information indicating yes is a type of real-time interaction information.

It may be understood that, in this embodiment of this disclosure, after receiving the second real-time interaction information, the first UE may present the second real-time interaction information. For example, if the second real-time interaction information includes content shot by a camera of the second UE, and the content includes a nod action or an "OK" gesture of a user, the first user equipment presents, on the screen of the first user equipment, information indicating yes, for example, a picture including the "OK" gesture.

In a possible implementation, the first video channel has an association relationship with the first media information application data channel. For example, an end point corresponding to the first video channel has an association relationship with an identifier of the first media information application data channel, or an IP address and a port number of the first video channel have an association relationship with an identifier of the first media information application data channel. In this way, the data channel service entity may determine that the real-time interaction information sent by the first UE through the first media information application data channel is to be sent to the second UE through the first video channel, and the real-time interaction information sent by the second UE through the first video channel is to be sent to the first UE through the first media information application data channel. In this embodiment of this disclosure, that the first video channel has an association relationship with the first media information application data channel may be understood as that the data channel service entity establishes a correspondence between the first video channel and the first media information application data channel.

Based on the method shown in FIG. 7, the data channel service entity may establish the first media information application data channel with the first UE, and establish the first video channel with the second UE. In this way, the data channel service entity may send, to the second UE through the first video channel, the real-time interaction information sent by the first UE through the first media information application data channel, and/or send, to the first UE through the first media information application data channel, the real-time interaction information sent by the second UE through the first video channel. Therefore, real-time interaction is implemented between a user of the first UE that supports establishment of a data channel and a user of the second UE that does not support establishment of a data channel in a call service, or real-time interaction is implemented between a user of the first UE that establishes a data channel and a user of the second UE that fails to establish a data channel in a call service.

Optionally, after or before S701 or when S701 is performed, a data channel server may further establish a second media information application data channel with the first UE, and establish a second video channel with the second UE. In this way, the data channel service entity may send, to the second UE through the second video channel, control data that is sent by the first UE through the second media information application data channel and that is used for controlling RTP data, and/or send, to the first UE through the second media information application data channel, control data that is sent by the second UE through the second video channel and that is used for controlling RTP data, to control the RTP data. In a possible implementation, the method shown in FIG. 7 further includes S701*a* and S703.

S701*a*: The data channel service entity establishes a second media information application data channel with the first UE, and establishes a second video channel with the second UE. Correspondingly, the first UE establishes the second media information application data channel with the data channel service entity, and the second UE establishes the second video channel with the data channel service entity.

The second media information application data channel is used to transmit RTCP data according to SCTP. The RTCP data includes control data and may be used to control RTP data. The second video channel is used to transmit RTCP data according to UDP.

S703: The data channel service entity sends, to the second UE through the second video channel, RTCP data sent by the first UE through the second media information application data channel, and/or sends, to the first UE through the second media information application data channel, RTCP data sent by the second UE through the second video channel.

In this embodiment of this disclosure, the RTCP data may include control data for controlling RTP data.

In this embodiment of this disclosure, a data packet transmitted through the second media information application data channel may be referred to as a data channel data packet, and a data packet transmitted through the second video channel may be referred to as a video channel data packet. The data channel data packet includes RTCP data. The video channel data packet includes RTCP data.

It may be understood that, in S703, a datagram protocol used for the data channel data packet is different from a datagram protocol used for the video channel data packet. To be specific, after receiving a data channel data packet from the first UE, the data channel service entity may parse the data channel data packet to obtain RTCP data, encapsulate the RTCP data into a video channel data packet, and send the video channel data packet to the second UE. Similarly, after receiving a video channel data packet from the second UE, the data channel service entity may parse the video channel data packet to obtain RTCP data, encapsulate the RTCP data into a data channel data packet, and send the data channel data packet to the first UE.

For example, when the first UE sends RTCP data to the second UE through the second media information application data channel, a data channel data packet and a video channel data packet may be shown in FIG. 9B. In FIG. 9B, the data channel data packet includes an IP header, a UDP header, a DTLS header, an SCTP header, and RTCP data. The video channel data packet includes an IP header, a UDP header, and RTCP data. After receiving the data channel data packet, the data channel service entity may separately remove the IP header, the UDP header, and the DTLS header, decrypt an obtained data packet, remove the SCTP header from a decrypted data packet to obtain the RTCP data, add a UDP header and an IP header to the RTCP data to obtain the video channel data packet, and then send the video channel data packet to the second UE through the second video channel. It may be understood that the foregoing DTLS header and decryption process are optional. If the foregoing DTLS header does not exist, the foregoing decryption process does not exist.

For example, when the second UE sends RTCP data to the first UE through the second video channel, the video channel data packet includes an IP header, a UDP header, and RTCP data. The data channel data packet includes an IP header, a UDP header, a DTLS header, an SCTP header, and RTCP data. After receiving the video channel data packet, the data channel service entity may separately remove the IP header and the UDP header to obtain the RTCP data, add an SCTP header to the RTCP data, encrypt the data packet to which the SCTP header is added, add a DTLS header, a UDP header, and an IP header to an encrypted data packet to obtain the data channel data packet, and then send the data channel data packet to the first UE through the second media information application data channel. It may be understood that the foregoing DTLS header and encryption process are also optional. If the foregoing encryption process does not exist, the foregoing DTLS header does not exist.

In a possible implementation, the second video channel has an association relationship with the second media information application data channel. For example, an end point corresponding to the second video channel has an association relationship with an identifier of the second media information application data channel, or an IP address and a port number of the second video channel have an association relationship with an identifier of the second media information application data channel. In this way, the data channel service entity may determine that the RTCP data sent by the first UE through the second media information application data channel is to be sent to the second UE through the second video channel, and the RTCP data sent by the second UE through the second video channel is to be sent to the first UE through the second media information application data channel. In this embodiment of this disclosure, that the second video channel has an association relationship with the second media information application data channel may be understood as that the data channel service entity establishes a correspondence between the second video channel and the second media information application data channel.

In the foregoing example, a data channel used to transmit RTP data (for example, the first media information application data channel) and a data channel used to transmit RTCP data (for example, the second media information application data channel) are separately established between the data channel service entity and UE. During actual application, the RTP data and the RTCP data may alternatively share one data channel. This is not limited. For example, the data channel service entity may establish a data channel A with the first UE, and establish video channels A and B with the second UE. The data channel A is used to transmit RTP data including real-time interaction information according to SCTP, and transmit RTCP data according to SCTP. The video channel A is used to transmit RTP data including real-time interaction information according to UDP, and the video channel B is used to transmit RTCP data according to UDP. RTP data sent by the first UE may be sent to the data channel service entity through the data channel A. After receiving the RTP data, the data channel service entity sends the RTP data to the second UE through the video channel A. RTCP data sent by the first UE may be sent to the data channel service entity through the data channel A. After receiving the RTCP data, the data channel service entity sends the RTCP data to the second UE through the video channel B. Similarly, RTP data sent by the second UE may be sent to the data channel service entity through the video channel A. After receiving the RTP data, the data channel service entity sends the RTP data to the first UE through the data channel A. RTCP data sent by the second UE may be sent to the data channel service entity through the video channel B. After receiving the RTCP data, the data channel service entity sends the RTCP data to the second UE through the data channel A.

In a possible design, if the RTP data and the RTCP data share one data channel, S701a may be replaced with the following step. The data channel service entity establishes a second video channel with the second UE. Correspondingly, the second UE establishes the second video channel with the data channel service entity. S703 may be replaced with the following step. The data channel service entity sends, to the second UE through the second video channel, RTCP data sent by the first UE through the first media information application data channel, and/or sends, to the first UE through the first media information application data channel, RTCP data sent by the second UE through the second video channel. For a specific process of the foregoing step after replacement, refer to the corresponding descriptions in S701a and S703. Details are not described herein again.

Optionally, before the data channel service entity establishes the first video channel or the second video channel with the second UE, the data channel service entity may determine not to establish a data channel between the data channel service entity and the second UE. In this case, the data channel service entity establishes a video channel, for example, the first video channel or the second video channel, with the second UE.

In a possible implementation, the method shown in FIG. 7 further includes S700a.

S700a: The data channel service entity determines not to establish a data channel between the data channel service entity and the second UE.

For example, the data channel service entity may determine, in at least the following two manners (S700a-1 or S700a-2), not to establish a data channel between the data channel service entity and the second UE.

S700a-1: The data channel service entity receives, from the second UE, indication information indicating whether a data channel is successfully established.

The indication information indicating whether a data channel is successfully established indicates a failure to establish a data channel between the data channel service entity and the second UE. After receiving, from the second UE, the indication information indicating whether a data channel is successfully established, the data channel service entity determines, based on the indication information indicating whether a data channel is successfully established, not to establish a data channel between the data channel service entity and the second UE.

In a possible design, the data channel service entity sends, to the second UE, information for requesting to establish a data channel with the second UE. The information for requesting to establish a data channel with the second UE carries media description information used by the data channel service entity to establish a data channel with the second UE. The information for requesting to establish a data channel with the second UE may be an invite request message (for example, an INVITE message 2 in a method shown in FIG. 10 below). After receiving the information for requesting to establish a data channel with the second UE, the second UE sends first response information to the data channel service entity. The first response information includes indication information indicating whether a data channel is successfully established. After receiving the first response information from the second UE, the data channel service entity may determine, based on the indication information indicating whether a data channel is successfully established, not to establish a data channel between the data channel service entity and the second UE. The first response information may be included in a 183 message (for example, a 183 message 1 in the method shown in FIG. 10). Any response information (for example, the first response information, second response information, third response information, or fourth response information) in this embodiment of this disclosure may be included in one response message for transmission. Unified descriptions are provided herein, and details are not described below again.

It may be understood that, in S700a-1, the first UE is calling-party user equipment, and the second UE is called-party user equipment. When the data channel service entity initiates, to the second UE, the request for establishing a data channel with the second UE, receives the first response information, and determines that the data channel fails to be established between the data channel service entity and the second UE, the data channel service entity may determine not to establish a data channel between the data channel service entity and the second UE.

It may be understood that, if the indication information indicating whether a data channel is successfully established carries media description information used by the second UE to establish a data channel with the data channel service entity, the data channel service entity may determine to establish a data channel between the data channel service entity and the second UE.

S700a-2: The data channel service entity receives, from the second UE, information for requesting to establish a channel other than a data channel, and determines, based on a case in which the information for requesting to establish a channel other than a data channel does not carry the media description information used by the second UE to establish a data channel with the data channel service entity, not to establish a data channel between the second UE and the data channel service entity. The information for requesting to establish a channel other than a data channel may be an invite request message (for example, an INVITE message 3 in the method shown in FIG. 10 below).

It may be understood that, in S700a-2, the first UE is called-party user equipment, and the second UE is calling-party user equipment. After receiving the information that does not carry the media description information used by the second UE to establish a data channel with the data channel service entity and that requests to establish a channel other than a data channel, the data channel service entity may determine not to establish a data channel between the data channel service entity and the second UE.

It may be understood that, if the information for requesting to establish a channel other than a data channel carries the media description information used by the second UE to establish a data channel with the data channel service entity, the data channel service entity may determine to establish a data channel between the data channel service entity and the second UE.

Optionally, after the data channel service entity determines not to establish a data channel between the data channel service entity and the second UE (that is, after S700a), or after the data channel service entity determines to establish a data channel between the data channel service entity and the second UE, the data channel service entity may indicate, to the first UE, whether to establish a data channel between the second UE and the data channel service entity (for example, indicate through S700c), so that the first UE determines whether to establish, between the first UE and the second UE, a data channel used to transmit real-time interaction information, or to establish, between the first UE and the data channel service entity, a data channel used to transmit real-time interaction information. If the first UE determines to establish a data channel between the first UE and the data channel service entity, the first UE may further request the data channel service entity to establish a data channel (for example, the first media information application data channel) used to transmit real-time interaction information with the first UE, and establish a video channel (for example, the first video channel) with the second UE. Subsequently, the data channel service entity may transmit real-time interaction information between the first UE and the second UE through data packet format conversion.

In a possible implementation, the method shown in FIG. 7 further includes S700c.

S700c: The data channel service entity sends data channel capability indication information to the first UE. Correspondingly, the first UE receives the data channel capability indication information from the data channel service entity.

In this embodiment of this disclosure, the data channel capability indication information indicates whether to establish a data channel between the second UE and the data channel service entity. It may be understood that the data channel capability indication information may alternatively be included in a response message and sent to the first UE.

It may be understood that, if the data channel service entity determines not to establish a data channel between the data channel service entity and the second UE before S700c, the data channel capability indication information indicates not to establish a data channel between the second UE and the data channel service entity. In this case, the first UE may establish a data channel (for example, the first media information application data channel, or the first media information application data channel and/or the second media information application data channel) between the first UE and the data channel service entity, and establish a video channel (for example, the first video channel, or the first video channel and/or the second video channel) between the data channel service entity and the second UE. If the data channel service entity determines to establish a data channel between the data channel service entity and the second UE before S700c, the data channel capability indication information indicates to establish a data channel between the second UE and the data channel service entity. In this case, the first UE may establish a data channel between the first UE and the second UE.

In a possible implementation, the data channel service entity sends the data channel capability indication information to the first UE based on a request of the first UE. In this case, before S700c, the method shown in FIG. 7 further includes S700b.

S700b: The first UE sends data channel capability query request information to the data channel service entity. Correspondingly, the data channel service entity receives the data channel capability query request information from the first UE.

In this embodiment of this disclosure, peer UE is any one or more UEs except the first UE in a plurality of UEs involved in one call service. For example, the plurality of UEs involved in the call service are UE 1 and UE 2. If the first UE is the UE 1, the peer UE is the UE 2.

In this embodiment of this disclosure, the data channel capability query request information may be used to request information about whether to establish a data channel between the second UE and the data channel service entity.

In an example, when the user of the first UE wants to send real-time interaction information to the user of the second UE, or at any moment after the call service starts and before the call service ends, the first UE may send the data channel capability query request information to the data channel service entity.

In a possible implementation, the first UE establishes a bootstrap data channel with the data channel service entity. Correspondingly, the data channel service entity establishes the bootstrap data channel with the first UE. In this case, the first UE sends the data channel capability query request information to the data channel service entity through the bootstrap data channel. The data channel capability query request information is used to request whether the peer UE (namely, the second UE) can establish a data channel or whether the peer UE has established a data channel. The data channel service entity sends the data channel capability indication information to the first UE through the bootstrap data channel. The data channel capability indication information indicates whether the second UE can establish a data channel or whether the second UE has established a data channel. Correspondingly, the data channel service entity receives the data channel capability query request information from the first UE through the bootstrap data channel, and the first UE receives the data channel capability indication information from the data channel service entity through the bootstrap data channel.

Data transmitted through the bootstrap data channel may be different from data transmitted through the first media information application data channel or the second media information application data channel.

It may be understood that the data channel capability query request information and the data channel capability indication information may or may not be transmitted through the bootstrap data channel. This is not limited.

It may be understood that S700b may be performed before S700a, or may be performed after S700a. This is not limited.

In a possible implementation, if the data channel capability indication information indicates not to establish a data channel between the second UE and the data channel service entity, after the first media information application data channel is established, or after the first media information application data channel and the second media information application data channel are established, through S701-1 to S701-4, the first UE may negotiate with the data channel service entity about media description information, where the media description information carries a parameter of RTP data transmitted in the first media information application data channel, for example, an encoding/decoding parameter of the RTP data, and the data channel service entity may negotiate with the second UE about media description information used to establish the first video channel between the data channel service entity and the second UE.

S701-1: The first UE sends video channel establishment trigger information to the data channel service entity. The video channel establishment trigger information is used to trigger the data channel service entity to establish the first video channel with the second UE. Correspondingly, the data channel service entity receives the video channel establishment trigger information from the first UE.

In this embodiment of this disclosure, the video channel establishment trigger information may carry first media description information and indication information for establishing the first video channel.

The first media description information carries a parameter of RTP data transmitted by the first UE through the first media information application data channel, for example, an encoding/decoding parameter of the RTP data. The indication information for establishing the first video channel is used to request to establish the first video channel. The video channel establishment trigger information further carries an identifier of the first media information application data channel, to indicate, to the data channel service entity, a data channel used to transmit RTP data. Optionally, the video channel establishment trigger information further carries an identifier of the second media information application data channel, to indicate, to the data channel service entity, a data channel used to transmit RTCP data.

It may be understood that, after receiving the video channel establishment trigger information, the data channel service entity may send video channel establishment request information to the second UE based on the indication information for establishing the first video channel, to establish the first video channel. The video channel establishment request information may include the parameter that is of the RTP data and that is carried in the first media description information.

Optionally, the identifier of the first media information application data channel may be configured by a device that initiates establishment of the first media information application data channel. For example, if the first UE is the device that initiates establishment of the first media information application data channel, the identifier of the first media information application data channel is configured by the first UE, or if the data channel service entity is the device that initiates establishment of the first media information application data channel, the identifier of the first media information application data channel is configured by the data channel service entity. Similarly, the identifier of the second media information application data channel may be configured by a device that initiates establishment of the second media information application data channel.

Optionally, the identifier of the first media information application data channel is an integer. In addition, the identifier of the first media information application data channel plus 1 is the identifier of the second media information application data channel.

In a possible design, a port number corresponding to a video channel used to transmit, according to UDP, RTP data including real-time interaction information has an association relationship with or has no association relationship with a port number corresponding to a video channel used to transmit, according to UDP, RTCP data including control data.

In an example, if there is an association relationship, the port number corresponding to the video channel used to transmit, according to UDP, the RTP data including the real-time interaction information plus 1 is the port number corresponding to the video channel used to transmit, according to UDP, the RTCP data including the control data. For example, a port number corresponding to the first video channel plus 1 is a port number corresponding to the second video channel.

It may be understood that, if the first UE establishes the bootstrap data channel with the data channel service entity, the first UE sends the video channel establishment trigger information to the data channel service entity through the bootstrap data channel. Correspondingly, the data channel service entity receives the video channel establishment trigger information from the first UE through the bootstrap data channel.

It may be understood that, the first UE may further establish another data channel with the data channel service entity, to transmit the video channel establishment trigger information and a video channel establishment result. For example, the first UE establishes a first signaling application data channel with the data channel service entity. Correspondingly, the data channel service entity establishes the first signaling application data channel with the first UE.

It may be understood that the video channel establishment trigger information and the video channel establishment result may alternatively not be transmitted through a data channel. This is not limited.

S701-2: The data channel service entity sends video channel establishment request information to the second UE. The video channel establishment request information is used to request to establish the first video channel with the second UE. Correspondingly, the second UE receives the video channel establishment request information from the data channel service entity.

In this embodiment of this disclosure, the video channel establishment request information carries second media description information. The second media description information is media description information used by the data channel service entity to establish the first video channel. The fifth request message may be a reINVITE message.

S701-3: The second UE sends a video channel establishment response to the data channel service entity. Correspondingly, the data channel service entity receives the video channel establishment response from the second UE.

The video channel establishment response carries third media description information. The third media description information is media description information used by the second UE to establish the first video channel.

S701-4: The data channel service entity sends the video channel establishment result to the first UE. Correspondingly, the first UE receives the video channel establishment result from the data channel service entity.

In this embodiment of this disclosure, the video channel establishment result carries fourth media description information. The fourth media description information carries a parameter of RTP data transmitted by the data channel service entity through the first media information application data channel, for example, an encoding/decoding parameter of the RTP data. The video channel establishment result further carries the identifier of the first media information application data channel, to indicate, to the first UE, a data channel used to transmit RTP data. Optionally, the video channel establishment result further carries the identifier of the second media information application data channel, to indicate, to the first UE, a data channel used to transmit RTCP data.

It may be understood that, if the first UE establishes the bootstrap data channel with the data channel service entity, the data channel service entity sends the video channel establishment result to the first UE through the bootstrap data channel. Correspondingly, the first UE receives the video channel establishment result from the data channel service entity through the bootstrap data channel. If the first UE establishes the first signaling application data channel with the data channel service entity, the data channel service entity sends the video channel establishment result to the first UE through the first signaling application data channel. Correspondingly, the first UE receives the video channel establishment result from the data channel service entity through the first signaling application data channel.

It may be understood that, in S701-1 to S701-4, the first UE triggers, based on the indication information for establishing the first video channel in the video channel establishment trigger information, establishment of the first video channel between the data channel service entity and the second UE. During actual application, when the data channel service entity determines not to establish a data channel between the second UE and the data channel service entity, the data channel service entity may alternatively trigger establishment of the first video channel between the data channel service entity and the second UE. This is not limited.

It may be understood that the data channel (for example, the first media information application data channel, and/or the second media information application data channel, and/or the bootstrap data channel, and/or the first signaling application data channel) in this embodiment of this disclosure may be established through a same SIP session, or may be established through different SIP sessions. Establishing a data channel through a SIP session may be understood as establishing the data channel in a process of establishing the SIP session, for example, establishing the data channel by carrying media description information for establishing the data channel through a request and/or a response for constructing the SIP session (for example, if the first media information application data channel is to be established, media description information for establishing the first media information application data channel is carried). Alternatively, establishing a data channel through a SIP session may be understood as establishing the data channel by carrying media description information for establishing the data channel in a request and/or response sent in the SIP session after the SIP session is set up.

In an example, the data channel in this embodiment of this disclosure may be established through a first SIP session. The first SIP session is a SIP session for establishing a call. Alternatively, the first SIP session is another SIP session independent of a SIP session for establishing a call. That is, the first SIP session may or may not be a SIP session for establishing a call. If the first SIP session is the SIP session for establishing the call, media of an IMS data channel is carried on an IMS access point name (APN). If the first session is the other SIP session independent of the SIP session for establishing the call, media of an IMS data channel is carried on a data APN.

In another example, the first media information application data channel, the second media information application data channel, the bootstrap data channel, and the first signaling application data channel may be established through at least two SIP sessions. For example, the first media information application data channel and the second media information application data channel are established through a SIP session 1, and the bootstrap data channel and the first signaling application data channel are established through a SIP session 2. The SIP session 1 is a SIP session for establishing a call, and the SIP session 2 is not a SIP session for establishing a call. For another example, the first media information application data channel is established through a SIP session 1, the second media information application data channel is established through a SIP session 2, and the bootstrap data channel and the first signaling application data channel are established through a SIP session 3. The SIP session 1 is a SIP session for establishing a call, and the SIP session 2 and the SIP session 3 are not SIP sessions for establishing a call. In addition, the SIP session 2 and the SIP session 3 are different sessions.

It may be understood that actions of the data channel service entity, the first UE, or the second UE in the method shown in FIG. 7 may be performed by the processor 601 in the communication apparatus 60 shown in FIG. 6 by invoking the application program code stored in the memory 603. This is not limited in this embodiment of this disclosure.

Figure 10:
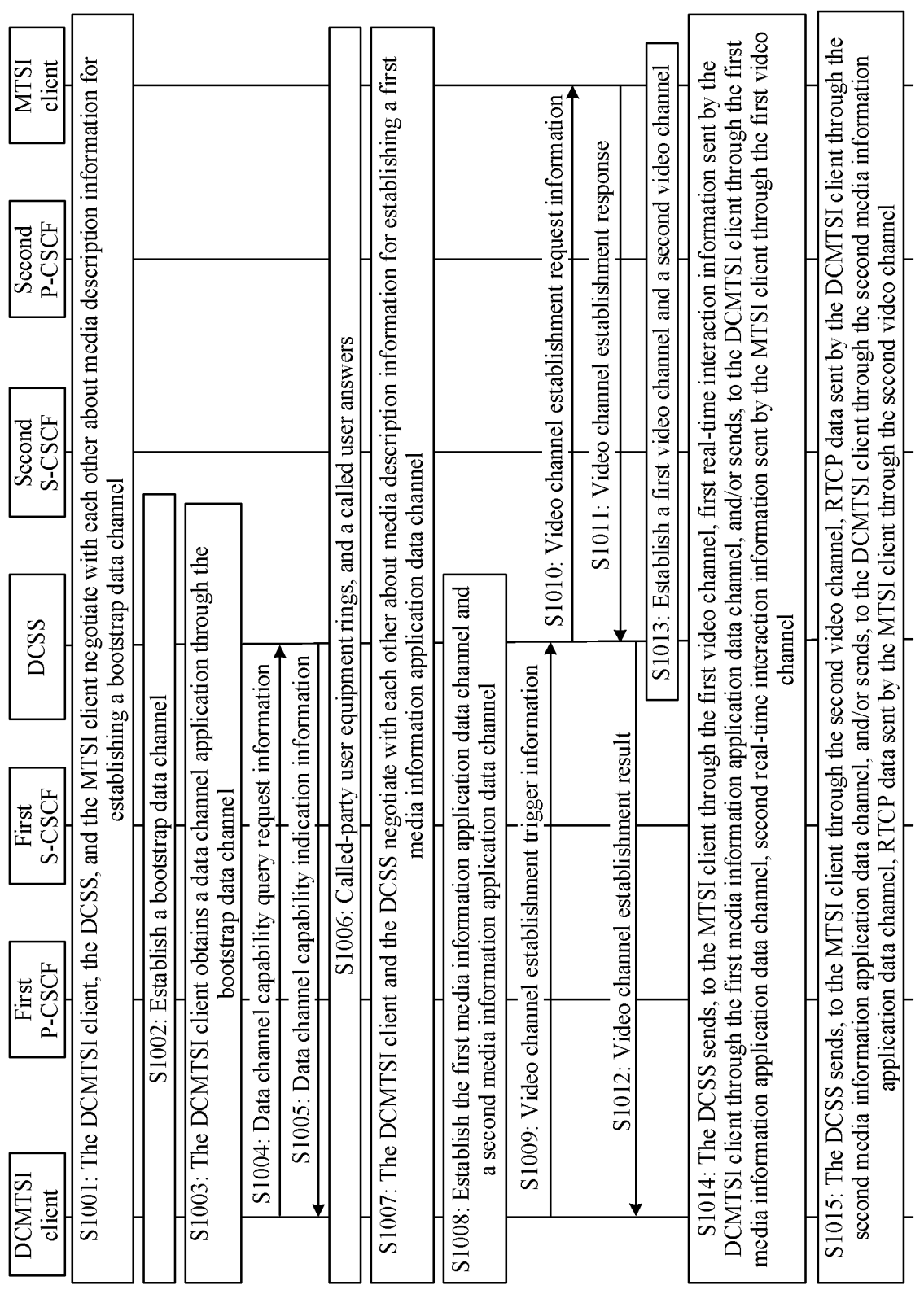
FIG. 10 is a schematic flowchart of a communication method according to an embodiment of this disclosure.

The following describes the communication method provided in this embodiment of this disclosure by using a procedure of a call service as an example. FIG. 10 shows another communication method according to an embodiment of this disclosure. The communication method includes S1001 to S1015.

S1001: A DCMTSI client, a DCSS, and an MTSI client negotiate with each other about media description information for establishing a bootstrap data channel.

It may be understood that a process of S1001 when the DCMTSI client is calling-party user equipment and the MTSI client is called-party user equipment is different from that when the DCMTSI client is called-party user equipment and the MTSI client is calling-party user equipment. The process of S1001 when the bootstrap data channel is established through a SIP session for establishing a call is also different from that when the bootstrap data channel is not established through the SIP session for establishing the call. Further, there may be the following four cases.

Case 1: When the DCMTSI client is the calling-party user equipment, the MTSI client is the called-party user equipment, and the bootstrap data channel is established through the SIP session for establishing the call, for a specific process of S1001, refer to corresponding descriptions in the following case 1.

Case 2: When the DCMTSI client is the called-party user equipment, the MTSI client is the calling-party user equipment, and the bootstrap data channel is established through the SIP session for establishing the call, for a specific process of S1001, refer to corresponding descriptions in the following case 2.

Case 3: When the DCMTSI client is the calling-party user equipment, the MTSI client is the called-party user equipment, and the bootstrap data channel is not established through the SIP session for establishing the call, for a specific process of S1001, refer to corresponding descriptions in the following case 3.

Case 4: When the DCMTSI client is the called-party user equipment, the MTSI client is the calling-party user equipment, and the bootstrap data channel is not established through the SIP session for establishing the call, for a specific process of S1001, refer to corresponding descriptions in the following case 4.

The following describes the four cases in detail.

For the case 1, the process of S1001 may include S1.1 to S1.4.

S1.1: The DCMTSI client initiates a call, and sends an invite request (INVITE) message 1, where the INVITE message 1 is routed to the DCSS through a first proxy call session control function (P-CSCF) and a first serving call session control function (S-CSCF).

The INVITE message 1 may carry media description information 1 used by the DCMTSI client to establish a bootstrap data channel with the DCSS. The media description information 1 may include related parameters needed for establishing a data channel, such as a port number, a bandwidth, a size of one piece of information, and the like. The media description information 1 may be shown as follows:

```
m=application 10001 UDP/DTLS/SCTP webrtc-datachannel
b=AS:500
a=max-message-size:1024
a=sctp-port:5000
a=setup:actpass
a=fingerprint:SHA-1
4A:AD:B9:B1:3F:82:18:3B:54:02:12:DF:3E:5D:49:6B:19:E5:7C:AB
a=tls-id:abc3de65cddef001be82
a=dcmap:0 subprotocol="http"
```

In the foregoing example, the port number is 10001, the bandwidth is 500 kilobits per second (kbps), the size of one piece of information is 1024 bytes, and a port number of SCTP is 5000.

S1.2: The DCSS replaces the media description information 1 in the INVITE message 1 with media description information 2 used by the DCSS to establish a bootstrap data channel with the MTSI client, to obtain an INVITE message 2, and sends the INVITE message 2, where the INVITE message 2 is routed to the MTSI client through the first S-CSCF, a second S-CSCF, and a second P-CSCF.

The media description information 2 may include related parameters needed for establishing a data channel, such as a port number and the like.

S1.3: The MTSI client sends a 183 message 1, where the 183 message 1 is routed to the DCSS through the second P-CSCF, the second S-CSCF, and the first S-CSCF.

It may be understood that the 183 message 1 carries Session Description Protocol (SDP) answer media description information in the INVITE message 2. If the MTSI client does not establish a data channel with the DCSS, the media description information indicates a failure to establish a data channel between the DCSS and the MTSI client. For example, a media (m) line port in the media description information is set to 0, to indicate that the MTSI client does not establish a data channel or fails to establish a data channel with the DCSS. The DCSS may determine, based on the 183 message 1, that no data channel is established between the MTSI client and the DCSS. It may be understood that the operation of setting the m line port to 0 may be performed by the MTSI client, or may be performed by an application server (AS) in a network in which the MTSI client is located. This is not limited. If the MTSI client establishes a data channel with the DCSS, the media description information includes a media description used by the MTSI client to establish a bootstrap data channel with the DCSS. The DCSS may determine, based on the 183 message 1, that a data channel is to be established between the MTSI client and the DCSS. The method shown in FIG. 10 is described by using an example in which the MTSI client does not establish a data channel with the DCSS. That is, steps after S1.3 are described on a premise that the MTSI client does not establish a data channel with the DCSS.

S1.4: The DCSS replaces the media description information that is related to the bootstrap data channel and that is in the 183 message 1 with media description information 3 used by the DCSS to establish a bootstrap data channel with the DCMTSI client, to obtain a 183 message 2, and sends the 183 message 2, where the 183 message 2 is routed to the DCMTSI client through the first S-CSCF and the first P-CSCF.

S1.1 to S1.4 are also a process of setting up a call SIP session, that is, for the case 1, in the process of setting up the call SIP session, the DCMTSI client, the DCSS, and the MTSI client negotiate with each other about media description information for establishing a bootstrap data channel.

For the case 2, the process of S1001 may include S2.1 to S2.4.

S2.1: The MTSI client initiates a call and sends an INVITE message 3, where the INVITE message 3 is routed to the DCSS through the second P-CSCF, the second S-CSCF, and the first S-CSCF.

The INVITE message 3 does not carry media description information used by the MTSI client to establish a bootstrap data channel with the DCSS. The DCSS may determine, based on a case in which the INVITE message 3 does not carry the media description information used by the MTSI client to establish a bootstrap data channel with the DCSS, that no data channel is established between the MTSI client and the DCSS.

S2.2: The DCSS determines that the INVITE message 3 does not carry the media description information used by the MTSI client to establish a bootstrap data channel with the DCSS, adds media description information 4 used by the DCSS to establish a bootstrap data channel with the DCMTSI client to the INVITE message 3, to obtain an INVITE message 4, and sends the INVITE message 4, where the INVITE message 4 is routed to the DCMTSI client through the first S-CSCF and the first P-CSCF.

The media description information 4 may include related parameters needed for establishing a data channel, such as a port number and the like.

S2.3: The DCMTSI client sends a 183 message 3, where the 183 message 3 is routed to the DCSS through the first P-CSCF and the first S-CSCF.

The 183 message 3 carries, through an SDP answer, media description information 5 used by the DCMTSI client to establish a bootstrap data channel with the DCSS.

S2.4: Because the INVITE message 3 does not carry the media description information used by the MTSI client to establish a bootstrap data channel with the DCSS, the DCSS deletes the media description information 5 in the 183 message 3, to obtain a 183 message 4, and sends the 183 message 4, where the 183 message 4 is routed to the MTSI client through the first S-CSCF, the second S-CSCF, and the second P-CSCF.

S2.1 to S2.4 are also a process of setting up a call SIP session, that is, for the case 2, in the process of setting up the call SIP session, the DCMTSI client, the DCSS, and the MTSI client negotiate with each other about media description information for establishing a bootstrap data channel.

For the case 3, the process of S1001 may include S3.1 to S3.4.

Before S1001, the DCMTSI client initiates a call, and constructs a SIP session 1 by using an INVITE message and a 183 message. The SIP session 1 is a SIP session for establishing a call.

S3.1: The DCMTSI client sends an INVITE message 5, where the INVITE message 5 is routed to the DCSS through the first P-CSCF and the first S-CSCF.

The INVITE message 5 may carry media description information 6 used by the DCMTSI client to establish a bootstrap data channel with the DCSS. The media description information 6 may include related parameters needed for establishing a data channel, such as a port number and the like. The INVITE message 5 is initiated through another SIP session 2 different from the SIP session 1.

S3.2: The DCSS replaces the media description information 6 in the INVITE message 5 with media description information 7 used by the DCSS to establish a bootstrap data channel with the MTSI client, to obtain an INVITE message 6, and sends the INVITE message 6.

The media description information 6 may include related parameters needed for establishing a data channel, such as a port number and the like.

S3.3: The DCSS determines not to establish a data channel between the MTSI client and the DCSS.

In a possible implementation, the MTSI client does not support establishment of a data channel. After the INVITE message 6 is routed to the second S-CSCF, the second S-CSCF does not find UE that supports establishment of a data channel, and the second S-CSCF sends a 4XX message, a 5XX message, or a 6XX message to the DCSS. Subsequently, after receiving the 4XX message, the 5XX message, or the 6XX message, the DCSS determines, based on the 4XX message, the 5XX message, or the 6XX message, that no data channel is established between the MTSI client and the DCSS.

In a possible implementation, a SIP session used to negotiate an IMS data channel is carried on a data APN. Therefore, UE that supports a data channel needs to initiate a SIP registration to a network by using the data APN, and is authenticated by the network. Then, the UE can establish the data channel. The registration is independent of an original SIP registration of the UE. The original SIP registration of the UE is carried on an IMS APN. In this case, if an account registered by the MTSI client by using the data APN is the same as an account registered by using the IMS APN, and the MTSI client does not support establishment of a data channel, after the INVITE message 6 is routed to the second S-CSCF, the second S-CSCF does not find UE that supports establishment of a data channel, and the second S-CSCF sends the 4XX message or the 5XX message or the 6XX message to the DCSS. Subsequently, the DCSS determines, based on the received 4XX message or 5XX message or 6XX message, that no data channel is established between the MTSI client and the DCSS. If the account registered by the MTSI client by using the data APN is different from the account registered by using the IMS APN, after the INVITE message 6 is routed to an interrogating call session control function (I-CSCF), the I-CSCF cannot find the account of the MTSI client (because the MTSI client does not open an account in an IMS network to which the MTSI client belongs). Therefore, a 4XX message, a 5XX message, or a 6XX message is sent to the DCSS. Subsequently, after receiving the 4XX message, the 5XX message, or the 6XX message, the DCSS determines, based on the 4XX message, the 5XX message, or the 6XX message, that no data channel is established between the MTSI client and the DCSS.

S3.4: The DCSS sends a 200 message, where the 200 message is routed to the DCMTSI client through the first S-CSCF and the first P-CSCF.

The 200 message carries media description information used by the DCSS to establish a bootstrap data channel with the DCMTSI client.

For the case 3, after the call SIP session is set up, the DCMTSI client, the DCSS, and the MTSI client negotiate, through the other SIP session, media description information for establishing a bootstrap data channel.

For the case 4, in a possible implementation, before S1001, the MTSI client initiates a call, and constructs a SIP session 1 by using an INVITE message and a 183 message. The SIP session 1 is a SIP session for establishing a call. Subsequently, a process in which the DCMTSI client, the DCSS, and the MTSI client negotiate with each other about media description information for a bootstrap data channel is similar to that in the case 3. Therefore, for details, refer to the descriptions in the case 3. The details are not described again. In another possible implementation, before S1001, the MTSI client initiates a call, and constructs a SIP session 1 by using an INVITE message and a 183 message. The SIP session 1 is a SIP session for establishing a call. After the INVITE message for establishing the SIP session 1 reaches the DCSS, the DCSS does not receive media description information for negotiating with the DCSS about a bootstrap data channel from the MTSI client within a period of time. The DCSS may initiate an INVITE message for establishing a SIP session 2 to the DCMTSI client. The message carries media description information for establishing a bootstrap data channel between the DCSS and the DCMTSI client, to trigger establishment of the bootstrap data channel between the DCSS and the DCMTSI client. After receiving the INVITE message for the SIP session 2, the DCMTSI client may return a 200 message, to establish the bootstrap data channel between the DCMTSI client and the DCSS.

For the case 4, after the call SIP session is set up, the DCMTSI client, the DCSS, and the MTSI client negotiate, through the other SIP session, media description information for establishing a bootstrap data channel.

S1002: The DCMTSI client establishes a bootstrap data channel with the DCSS. Correspondingly, the DCSS establishes the bootstrap data channel with the DCMTSI client.

S1003: The DCMTSI client obtains a data channel application through the bootstrap data channel.

In a possible implementation, the DCMTSI client sends a request for obtaining the data channel application to the DCSS through the bootstrap data channel. The data channel application may include a web page. After receiving the request, the DCSS sends the data channel application to the DCMTSI client. After receiving the data channel application, the DCMTSI client loads and runs the data channel application.

S1004: The DCMTSI client sends data channel capability query request information to the DCSS. Correspondingly, the DCSS receives the data channel capability query request information from the DCMTSI client.

In a possible implementation, the data channel application triggers the DCMTSI client to send the data channel capability query request information to the DCSS.

In an example, the data channel capability query request information may be as follows: GET/remoteDcStatus HTTP/1.1.

S1005: The DCSS sends data channel capability indication information to the DCMTSI client. Correspondingly, the DCMTSI client receives the data channel capability indication information from the DCSS.

In an example, the data channel capability indication information may be shown as follows:

```
HTTP/1.1 200 OK
Content-Type: application/json
Content-Length: 36
{
  "remoteDcStatus": unconnected
}
```

-continued

""remoteDcStatus": unconnected" in the foregoing example may indicate not to
establish a data channel between the second user equipment and the DCSS.

For other descriptions of S1004 to S1005, refer to corresponding descriptions of S700b to S700c in the method shown in FIG. 7.

It may be understood that, in S1001, the DCSS determines not to establish a data channel between the DCSS and the MTSI client. Therefore, in the method shown in FIG. 10, the data channel capability indication information indicates not to establish a data channel between the DCSS and the MTSI client.

In a possible implementation, the DCMTSI client sends the data channel capability query request information to the DCSS through the bootstrap data channel. Correspondingly, the DCSS receives the data channel capability query request information from the DCMTSI client through the bootstrap data channel. The DCSS sends the data channel capability indication information to the DCMTSI client through the bootstrap data channel. Correspondingly, the DCMTSI client receives the data channel capability indication information from the DCSS through the bootstrap data channel. In addition, a second signaling application data channel may be further established between the DCMTSI client and the DCSS. The data channel capability query request information and the data channel capability indication information are transmitted through the second signaling application data channel.

In a possible implementation, after S1003, the DCMTSI client sends, to the DCSS, information for requesting to establish the second signaling application data channel. The information for requesting to establish the second signaling application data channel carries media description information used by the DCMTSI client to establish the second signaling application data channel. The information for requesting to establish the second signaling application data channel may be an update message or a reINVITE message. After receiving, from the DCMTSI client, the information for requesting to establish the second signaling application data channel, the DCSS sends fourth response information to the DCMTSI client. The fourth response information carries media description information used by the DCSS to establish the second signaling application data channel. The fourth response information may be a 200 message.

The second signaling application data channel may be an end-to-end data channel between the DCSS and the DCMTSI client, or may be a data channel established by the DCSS with the DCMTSI client through an IMS AGW. This is not limited.

S1006: The called-party user equipment rings, and a called user answers.

It may be understood that, if the DCMTSI client is the called-party user equipment, the DCMTSI client rings, and a user corresponding to the DCMTSI client answers. If the MTSI client is the called-party user equipment, the MTSI client rings, and a user corresponding to the MTSI client answers.

It may be understood that, after S1006, the user of the DCMTSI client may enable a service function of the data channel application, for example, screen sharing. In S1005, the DCMTSI client determines that no data channel is established between the MTSI client and the DCSS. Therefore, the DCMTSI client may negotiate with the DCSS about media description information for establishing a first media information application data channel, establish the first media information application data channel with the DCSS, and request establishment of a first video channel between the DCSS and the MTSI client. In this way, real-time interaction information between the DCMTSI client and the MTSI client may be forwarded through the DCSS.

For descriptions of the first media information application data channel and the first video channel, refer to the corresponding descriptions in the method shown in FIG. 7. It may be understood that, if a data channel is established between the MTSI client and the DCSS, the DCMTSI client may establish an end-to-end data channel with the MTSI client to transmit real-time interaction information, and there is no need to forward the real-time interaction information between the DCMTSI client and the MTSI client by the DCSS.

S1007: The DCMTSI client and the DCSS negotiate with each other about the media description information for establishing the first media information application data channel.

In a possible implementation, the DCMTSI client sends a reINVITE message. The reINVITE message is routed to the DCSS through the first P-CSCF and the first S-CSCF. The reINVITE message carries the media description information used by the DCMTSI client to establish the first media information application data channel. The media description information may include related parameters needed for establishing a data channel, such as a port number and the like. After receiving the reINVITE message, the DCSS sends a 200 message. The 200 message is routed to the DCMTSI client through the first S-CSCF and the first P-CSCF. The 200 message carries media description information used by the DCSS to establish the first media information application data channel. The media description information includes related parameters needed for establishing a data channel, such as a port number and the like.

S1008: The DCMTSI client establishes the first media information application data channel and a second media information application data channel with the DCSS. Correspondingly, the DCSS establishes the first media information application data channel and the second media information application data channel with the DCMTSI client.

For descriptions of the second media information application data channel, refer to the descriptions in the method shown in FIG. 7. Details are not described again.

S1009: The DCMTSI client sends video channel establishment trigger information to the DCSS. Correspondingly, the DCSS receives the video channel establishment trigger information from the DCMTSI client.

For example, the video channel establishment trigger information may include the following content:

X-DC-Destination: /ARRemoteGuide/requestVideoConnection
X-DC-MsgType: offer
{

-continued

```
"mediaDescription":"v=0
o=- 0 1 IN IP4 0.0.0.0
s=DCMTSI call
c=IN IP4 0.0.0.0    // where an IP address is set to all Os, indicating to ignore IP
information
    b=CT:4096
    t=0 0
    m=video 9 UDP/DTLS/SCTP/RTP/AVP 123      // where a port is set to 9, indicating
to ignore port information
    b=AS:960
    b=RR:6000
    b=RS:8000
    a=rtpmap:123 H264/90000
    a=fmtp:123 profile-level-id=42801F;max-fs=3600;max-mbps=108000;packetization-
mode=0;max-br=974;sprop-parameter-sets=Z0LAHtoHgUSAeEAhUA==,aM48gA==
    a=rtcp-fb:* trr-int 5000
    a=rtcp-fb:* ccm fir
    a=rtcp-fb:* ccm tmmbr
    a=rtcp-fb:* nack
    a=rtcp-fb:* nack pli
    a=sendrecv
    a=dcmap:1000 subprotocol="rtp" label=xxx        // an identifier of the first media
information application data channel
    a=dcmap:1001 subprotocol="rtcp" label=yyy"    // an identifier of the second media
information application data channel
    }
```

In the foregoing example, "requestVideoConnection" in the first line may be used to request to establish the first video channel. The content in "{ }" is content carried in first media description information. The first media description information corresponds to the first media description information in the method shown in FIG. 7.

It may be understood that, because the DCMTSI client communicates with the DCSS through a data channel, an IP address and a port do not need to be used. Therefore, the IP address may be set to all Os to ignore the IP address, and the port may be set to 9 to ignore the port information.

S1010: The DCSS sends video channel establishment request information to the MTSI client. Correspondingly, the MTSI client receives the video channel establishment request information from the DCSS.

For example, second media description information in the video channel establishment request information may include the following content:

```
v=0
o=- 0 1 IN IP4 192.168.0.124
S=DCMTSI call
c=IN IP4 192.168.0.124
b=CT:4096
t=0 0
m=video 32965 UDP/DTLS/SCTP/RTP/AVP 123
b=AS:960
b=RR:6000
b=RS:8000
a=rtpmap:123 H264/90000
a=fmtp:123 profile-level-id=42801F;max-fs=3600;max-mbps=108000;packetization-
mode=0;max-br=974;sprop-parameter-sets=ZOLAHtoHgUSAeEAhUA==,aM48gA==
a=rtcp-fb:* trr-int 5000
a=rtcp-fb:* ccm fir
a=rtcp-fb:* ccm tmmbr
a=rtcp-fb:* nack
a=rtcp-fb:* nack pli
a=sendrecv
```

The IP address and the port are allocated by the DCSS.

S1011: The MTSI client sends a video channel establishment response to the DCSS. Correspondingly, the DCSS receives the video channel establishment response from the MTSI client.

S1012: The DCSS sends a video channel establishment result to the DCMTSI client. Correspondingly, the DCMTSI client receives the video channel establishment result from the DCSS.

For example, the video channel establishment result may include the following content:

```
X-DC-Destination:/ARRemoteGuide/requestVideoConnection
X-DC-MsgType: answer
{
"mediaDescription": "v=0
o=- 0 1 IN IP4 0.0.0.0
s=MTSI call
c=IN IP4 0.0.0.0     // where an IP address is set to all 0s, indicating to ignore IP
information
b=CT:4096
t=0 0
m=video 9 UDP/DTLS/SCTP/RTP/AVP 123     // where a port is set to 9, indicating
to ignore port information
b=AS:960
b=RR:6000
b=RS:8000
a=rtpmap:123 H264/90000
a=fmtp:123 profile-level-id=42801F;max-fs=3600;max-mbps=108000;packetization-
mode=0;max-br=974;sprop-parameter-sets=ZOLAHtoHgUSAeEAhUA==,aM48gA==
a=rtcp-fb:* trr-int 5000
a=rtcp-fb:* ccm fir
a=rtcp-fb:* ccm tmmbr
a=rtcp-fb:* nack
a=rtcp-fb:* nack pli
a=sendrecv
a=dcmap:1000 subprotocol="rtp" label=xxx        // an identifier of the first media
information application data channel
a=dcmap:1001 subprotocol="rtcp" label=yyy"    // an identifier of the second media
information application data channel
}
```

The content in "{ }" is content in the media description information carried in the video channel establishment result.

For other descriptions of S1009 to S1012, refer to the corresponding descriptions in S701-1 to S701-4 in the method shown in FIG. 7.

It may be understood that the first UE establishes the first signaling application data channel with the DCSS in S701-1. In a possible design, after S1006, the DCMTSI client negotiates with the DCSS about media description information for establishing a first signaling application data channel, and establishes the first signaling application data channel with the DCSS. This process may be performed simultaneously with S1007 and S1008, or may be performed separately.

In an example, the DCMTSI client sends a reINVITE message. The reINVITE message is routed to the DCSS through the first P-CSCF and the first S-CSCF. The reINVITE message carries media description information used by the DCMTSI client to establish the first signaling application data channel. The media description information may include related parameters needed for establishing a data channel, such as a port number and the like. After receiving the reINVITE message, the DCSS sends a 200 message. The 200 message is routed to the DCMTSI client through the first S-CSCF and the first P-CSCF. The 200 message carries media description information used by the DCSS to establish the first signaling application data channel. The media description information includes related parameters needed for establishing a data channel, such as a port number and the like.

S1013: The DCSS establishes the first video channel and a second video channel with the MTSI client. Correspondingly, the MTSI client establishes the first video channel and the second video channel with the DCSS.

For descriptions of the first video channel and the second video channel, refer to the descriptions in the method shown in FIG. 7. Details are not described.

S1014: The DCSS sends, to the MTSI client through the first video channel, first real-time interaction information sent by the DCMTSI client through the first media information application data channel, and/or sends, to the DCMTSI client through the first media information application data channel, second real-time interaction information sent by the MTSI client through the first video channel.

For descriptions of S1014, refer to the corresponding descriptions in S702 in the method shown in FIG. 7. Details are not described.

S1015: The DCSS sends, to the MTSI client through the second video channel, RTCP data sent by the DCMTSI client through the second media information application data channel, and/or sends, to the DCMTSI client through the second media information application data channel, RTCP data sent by the MTSI client through the second video channel.

For descriptions of S1015, refer to the corresponding descriptions in S703 in the method shown in FIG. 7. Details are not described.

It may be understood that the actions of the DCSS, the DCMTSI client, or the MTSI client in S1001 to S1015 may be performed by the processor 601 in the communication apparatus 60 shown in FIG. 6 by invoking the application program code stored in the memory 603. This is not limited in this embodiment of this disclosure.

Figure 11:
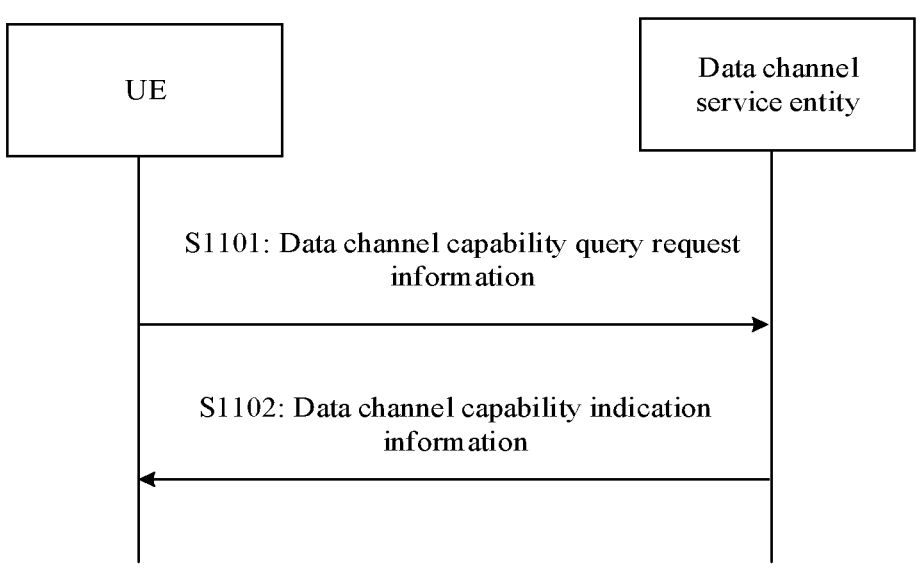
FIG. 11 is a schematic flowchart of a communication method according to an embodiment of this disclosure.

FIG. 11 shows still another communication method according to an embodiment of this disclosure. In the communication method, first UE may query a data channel service entity about whether to establish a data channel between second UE and the data channel service entity, so that the first UE determines whether to establish, between the first UE and the second UE, a data channel used to transmit real-time interaction information. The communication method may include S1101 and S1102.

S1101: UE sends data channel capability query request information to the data channel service entity. Correspondingly, the data channel service entity receives the data channel capability query request information from the UE.

S1102: The data channel service entity sends data channel capability indication information to the UE. Correspondingly, the UE receives the data channel capability indication information from the data channel service entity.

For a specific process of S1101 and S1102, refer to the corresponding descriptions in S700b and S700c in the method shown in FIG. 7. Details are not described herein.

It may be understood that, if the data channel capability indication information indicates that no data channel is not established between the second UE and the data channel service entity, the data channel service entity determines, before S1101, that no data channel is established between the second UE and the data channel service entity. For this process, refer to the corresponding descriptions in S700a in the method shown in FIG. 7. Details are not described herein.

Based on the method shown in FIG. 11, the UE may query the data channel service entity about whether to establish a data channel between peer UE and the data channel service entity, so that the UE determines whether to establish, between the UE and the peer UE, a data channel used to transmit real-time interaction information. If a data channel is established between the peer UE and the data channel service entity, the UE determines to establish, between the UE and the peer UE, the data channel used to transmit the real-time interaction information, and the UE and the peer UE may directly transmit the real-time interaction information. If no data channel is established between the peer UE and the data channel service entity, the UE determines to establish a data channel used to transmit real-time interaction information between the UE and the data channel service entity, and skip establishing, between the UE and the peer UE, a data channel used to transmit real-time interaction information. In this case, the data channel service entity may establish a video channel with the peer UE. In this way, a data packet format is converted by the data channel service entity, so that real-time interaction information can be transmitted between the UE and the peer UE.

It may be understood that the actions of the data channel service entity or the UE in S1101 and S1102 may be performed by the processor 601 in the communication apparatus 60 shown in FIG. 6 by invoking the application program code stored in the memory 603. This is not limited in this embodiment of this disclosure.

Embodiments mentioned above in this disclosure may be combined on a premise that solutions are not contradictory. This is not limited.

It may be understood that, in the foregoing embodiments, the method and/or the step implemented by the data channel service entity may alternatively be implemented by a component (for example, a chip or a circuit) that can be used in the data channel service entity, and the method and/or the step implemented by the first UE may alternatively be implemented by a component (for example, a chip or a circuit) that can be used in the first UE.

The foregoing mainly describes, from a perspective of interaction between devices, the solutions provided in embodiments of this disclosure. It may be understood that, to implement the foregoing functions, the data channel service entity, the first UE, or the like includes corresponding hardware structures and/or software modules for performing the functions. A person skilled in the art can be easily aware that, in combination with units and algorithm operations of the examples described in embodiments disclosed in this specification, this disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it cannot be considered that the implementation goes beyond the scope of this disclosure.

In embodiments of this disclosure, the data channel service entity or the first UE may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It may be understood that, in embodiments of this disclosure, division into the modules is an example, and is merely logical function division. During actual implementation, another division manner may be used.

Figure 12:
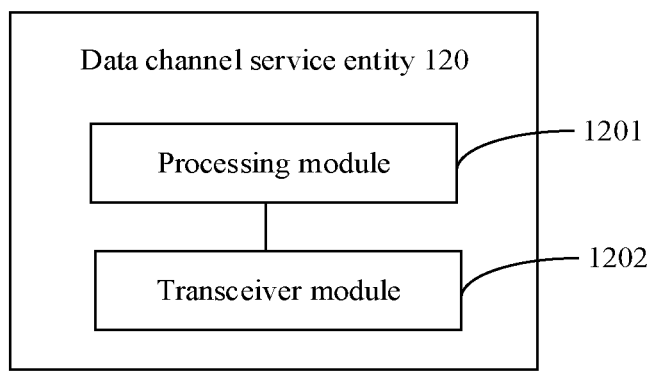
FIG. 12 is a schematic diagram of a structure of a data channel service entity according to an embodiment of this disclosure.

For example, when the functional modules are obtained through division in an integrated manner, FIG. 12 is a schematic diagram of a structure of a data channel service entity 120. The data channel service entity 120 includes a processing module 1201 and a transceiver module 1202. The processing module 1201 is configured to perform an operation other than receiving and/or sending data or information by the data channel service entity in embodiments of this disclosure, for example, S701, and/or S700a, and/or S701a. The processing module 1201 may also be referred to as a processing unit, and is configured to implement a function other than a transceiver function, for example, may be a processor. The transceiver module 1202 is configured to perform an operation of receiving and/or sending data or information by the data channel service entity in embodiments of this disclosure, for example, S702, and/or S703, and/or S700a-1, and/or S700a-2, and/or S700b, and/or S700c. The transceiver module 1202 may also be referred to as a transceiver unit, and is configured to implement a transceiver function. For example, the transceiver module 1202 may be a transceiver circuit, a transceiver machine, a transceiver, or a communication interface.

In some embodiments, the data channel service entity 120 may further include a storage module configured to store program instructions and data.

For example, the data channel service entity 120 is, for example, the data channel service entity in the embodiment shown in FIG. 7 or the embodiment shown in FIG. 10. The data channel service entity 120 is configured to transmit real-time interaction information between first UE and second UE that are in a same call service.

For example, the processing module 1201 is configured to establish a first data channel with the first UE and establish a first video channel with the second UE. The first data channel is used to transmit data according to SCTP, and the first video channel is used to transmit data according to UDP.

The transceiver module 1202 is configured to send, to the second UE through the first video channel, first real-time interaction information sent by the first UE through the first data channel, and/or send, to the first UE through the first data channel, second real-time interaction information sent by the second UE through the first video channel.

For other functions that can be implemented by the data channel service entity 120, refer to the related descriptions of the embodiment shown in FIG. 7 or the embodiment shown in FIG. 10. Details are not described.

In a simple embodiment, a person skilled in the art may figure out that the data channel service entity 120 may be in the form shown in FIG. 6. For example, the processor 601 in FIG. 6 may invoke the computer-executable instructions stored in the memory 603, to enable the data channel service entity 120 to perform the methods related to the data channel entity in the foregoing method embodiments, for example, S701 and S702.

For example, functions/implementation processes of the processing module 1201 and the transceiver module 1202 in FIG. 12 may be implemented by the processor 601 in FIG. 6 by invoking the computer-executable instructions stored in the memory 603. Alternatively, functions/implementation processes of the processing module 1201 in FIG. 12 may be implemented by the processor 601 in FIG. 6 by invoking the computer-executable instructions stored in the memory 603, and functions/implementation processes of the transceiver module 1202 in FIG. 12 may be implemented by using the communication interface 604 in FIG. 6.

Figure 13:
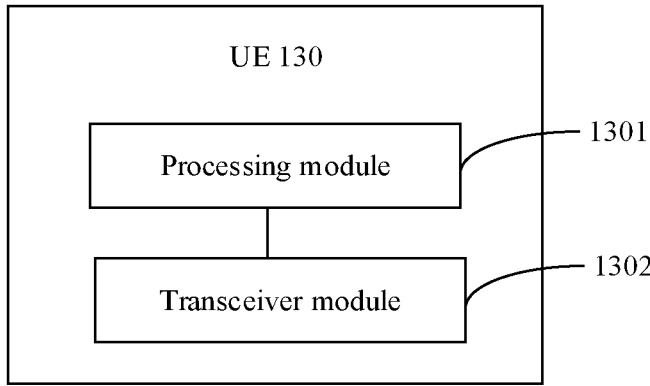
FIG. 13 is a schematic diagram of a structure of UE according to an embodiment of this disclosure.

For example, when the functional modules are obtained through division in an integrated manner, FIG. 13 is a schematic diagram of a structure of UE 130. The UE 130 includes a processing module 1301 and a transceiver module 1302. The processing module 1301 is configured to perform an operation other than receiving and/or sending data or information by first UE in embodiments of this disclosure, for example, S701 and/or S701*a*. The processing module 1301 may also be referred to as a processing unit, and is configured to implement a function other than a transceiver function, for example, may be a processor. The transceiver module 1302 is configured to perform an operation of receiving and/or sending data or information by the first UE in embodiments of this disclosure, for example, S702, and/or S703, and/or S700*b*, and/or S700*c*. The transceiver module 1302 may also be referred to as a transceiver unit, and is configured to implement a transceiver function. For example, the transceiver module 1302 may be a transceiver circuit, a transceiver machine, a transceiver, or a communication interface.

In some embodiments, the UE 130 may further include a storage module (not shown in FIG. 13) configured to store program instructions and data.

For example, the UE 130 is configured to implement a function of the first UE. The UE 130 is, for example, the first UE in the embodiment shown in FIG. 7. Alternatively, the UE 130 is configured to implement a function of the DCMTSI client. The UE 130 is, for example, the DCMTSI client in the embodiment shown in FIG. 10. The UE 130 and peer UE are in a same call service, and the UE 130 and the peer UE transmit real-time interaction information through a data channel service entity.

For example, the processing module 1301 is configured to establish a first data channel with the data channel service entity and trigger the data channel service entity to establish a first video channel with the peer UE. The first data channel is used to transmit data according to SCTP, and the first video channel is used to transmit data according to UDP.

The transceiver module 1302 is configured to send first real-time interaction information to the data channel service entity through the first data channel, to trigger the data channel service entity to send the first real-time interaction information to the peer UE through the first video channel, and/or receive, from the data channel service entity through the first data channel, second real-time interaction information received by the data channel service entity through the first video channel.

When the UE 130 is configured to implement the function of the first UE, for another function that can be implemented by the UE 130, refer to the related descriptions of the embodiment shown in FIG. 7 or the embodiment shown in FIG. 10. Details are not described.

In a simple embodiment, a person skilled in the art may figure out that the UE 130 may be in the form shown in FIG. 6. For example, the processor 601 in FIG. 6 may invoke the computer-executable instructions stored in the memory 603, to enable the UE 130 to perform the methods related to the first UE in the foregoing method embodiments, for example, S701.

For example, functions/implementation processes of the processing module 1301 and the transceiver module 1302 in FIG. 13 may be implemented by the processor 601 in FIG. 6 by invoking the computer-executable instructions stored in the memory 603. Alternatively, functions/implementation processes of the processing module 1301 in FIG. 13 may be implemented by the processor 601 in FIG. 6 by invoking the computer-executable instructions stored in the memory 603, and functions/implementation processes of the transceiver module 1302 in FIG. 13 may be implemented by using the communication interface 604 in FIG. 6.

Figure 14:
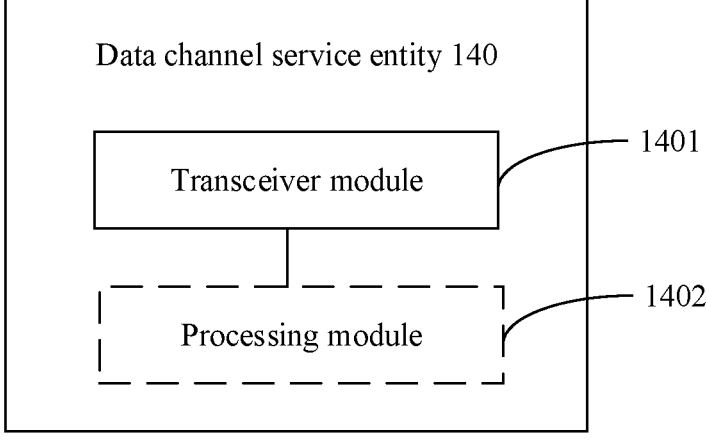
FIG. 14 is a schematic diagram of a structure of a data channel service entity according to an embodiment of this disclosure.

For example, when the functional modules are obtained through division in an integrated manner, FIG. 14 is a schematic diagram of a structure of a data channel service entity 140. The data channel service entity 140 includes a transceiver module 1401. The transceiver module 1401 is configured to perform an operation of receiving and/or sending data or information by the data channel service entity in embodiments of this disclosure, for example, S1101 and/or S1102. The transceiver module 1401 may also be referred to as a transceiver unit, and is configured to implement a transceiver function. For example, the transceiver module 1401 may be a transceiver circuit, a transceiver machine, a transceiver, or a communication interface. Optionally, the data channel service entity 140 further includes a processing module 1402. The processing module 1402 is configured to perform an operation other than receiving and/or sending data or information by the data channel service entity in embodiments of this disclosure. The processing module 1402 may also be referred to as a processing unit, and is configured to implement a function other than a transceiver function, for example, may be a processor.

In some embodiments, the data channel service entity 140 may further include a storage module configured to store program instructions and data.

For example, the data channel service entity 140 is, for example, the data channel service entity in the embodiment shown in FIG. 11. The data channel service entity 140 is configured to transmit real-time interaction information between first UE and second UE that are in a same call service.

For example, the transceiver module 1401 is configured to receive third request information from the first UE. The third request information is used to request information about whether to establish a data channel between the second UE and the data channel service entity 140.

The transceiver module 1401 is further configured to send third indication information to the first UE. The third indication information indicates whether to establish a data channel between the second UE and the data channel service entity 140.

For other functions that can be implemented by the data channel service entity 140, refer to the related descriptions of the embodiment shown in FIG. 11. Details are not described.

In a simple embodiment, a person skilled in the art may figure out that the data channel service entity 140 may be in the form shown in FIG. 6. For example, the processor 601 in FIG. 6 may invoke the computer-executable instructions stored in the memory 603, to enable the data channel service entity 140 to perform the methods related to the data channel service entity in the foregoing method embodiments, for example, S1101 and S1102.

For example, functions/implementation processes of the transceiver module 1401 and the processing module 1402 in FIG. 14 may be implemented by the processor 601 in FIG. 6 by invoking the computer-executable instructions stored in the memory 603. Alternatively, functions/implementation processes of the processing module 1402 in FIG. 14 may be implemented by the processor 601 in FIG. 6 by invoking the computer-executable instructions stored in the memory 603, and functions/implementation processes of the transceiver module 1401 in FIG. 14 may be implemented by using the communication interface 604 in FIG. 6.

Figure 15:
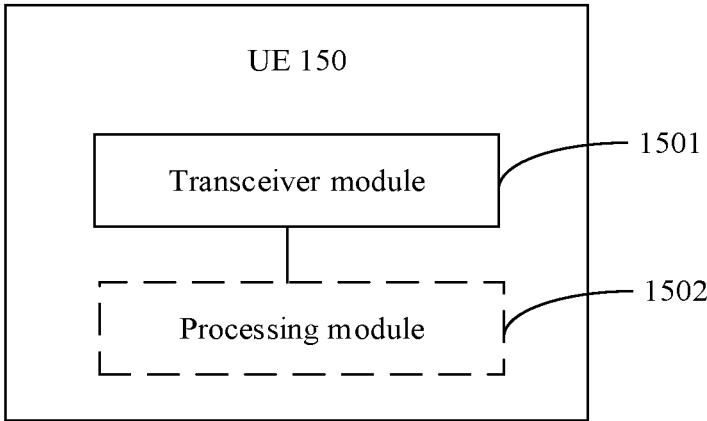
FIG. 15 is a schematic diagram of a structure of UE according to an embodiment of this disclosure.

For example, when the functional modules are obtained through division in an integrated manner, FIG. 15 is a schematic diagram of a structure of UE 150. The UE 150 includes a transceiver module 1501. The transceiver module 1501 is configured to perform an operation of receiving and/or sending data or information by the UE in embodiments of this disclosure, for example, S1101 and/or S1102. The transceiver module 1501 may also be referred to as a transceiver unit, and is configured to implement a transceiver function. For example, the transceiver module 1501 may be a transceiver circuit, a transceiver machine, a transceiver, or a communication interface. Optionally, the UE 150 further includes a processing module 1502. The processing module 1502 is configured to perform an operation other than receiving and/or sending data or information by the UE in embodiments of this disclosure. The processing module 1502 may also be referred to as a processing unit, and is configured to implement a function other than a transceiver function, for example, may be a processor.

In some embodiments, the UE 150 may further include a storage module (not shown in FIG. 15) configured to store program instructions and data.

For example, the UE 150 is configured to implement a function of the UE. The UE 150 is, for example, the UE in the embodiment shown in FIG. 11. The UE 150 and peer UE are in a same call service, and the UE 150 and the peer UE transmit real-time interaction information through a data channel service entity.

For example, the transceiver module 1501 is configured to send third request information to the data channel service entity. The third request information is used to request information about whether to establish a data channel between the peer UE and the data channel service entity.

The transceiver module 1501 is further configured to receive third indication information from the data channel service entity. The third indication information indicates whether to establish a data channel between the peer UE and the data channel service entity.

When the UE 150 is configured to implement the function of the UE, for another function that can be implemented by the UE 150, refer to the related descriptions of the embodiment shown in FIG. 11. Details are not described.

In a simple embodiment, a person skilled in the art may figure out that the UE 150 may be in the form shown in FIG.

6. For example, the processor 601 in FIG. 6 may invoke the computer-executable instructions stored in the memory 603, to enable the UE 150 to perform the methods related to the first UE in the foregoing method embodiments, for example, S1101 and S1102.

For example, functions/implementation processes of the transceiver module 1501 and the processing module 1502 in FIG. 15 may be implemented by the processor 601 in FIG. 6 by invoking the computer-executable instructions stored in the memory 603. Alternatively, functions/implementation processes of the processing module 1502 in FIG. 15 may be implemented by the processor 601 in FIG. 6 by invoking the computer-executable instructions stored in the memory 603, and functions/implementation processes of the transceiver module 1501 in FIG. 15 may be implemented by using the communication interface 604 in FIG. 6.

It may be understood that one or more of the foregoing modules or units may be implemented by software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built into a system-on-chip (SoC) or an ASIC, or may be an independent semiconductor chip. In addition to a core configured to execute software instructions to perform an operation or processing, the processor may further include a necessary hardware accelerator, for example, a field-programmable gate array (FPGA), a programmable logic device (PLD), or a logic circuit that implements a dedicated logic operation.

When the foregoing modules or units are implemented by hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device. The hardware can run necessary software or perform the foregoing method procedure without depending on software.

Optionally, an embodiment of this disclosure further provides a chip system, including at least one processor and an interface. The at least one processor is coupled to a memory through the interface. When the at least one processor executes a computer program or instructions in the memory, the method according to any one of the foregoing method embodiments is performed. In a possible implementation, the chip system further includes a memory. Optionally, the chip system may include a chip, or may include a chip and another discrete device. This is not limited in this embodiment of this disclosure.

Optionally, an embodiment of this disclosure further provides a computer-readable storage medium. All or some of the procedures in the foregoing method embodiments may be implemented by a computer program instructing related hardware. The program may be stored in the computer-readable storage medium. When the program is executed, the procedures of the foregoing method embodiments may be included. The computer-readable storage medium may be an internal storage unit of the apparatus (for example, the data channel service entity or the first UE) in any one of the foregoing embodiments, for example, a hard disk or a memory of the apparatus. Alternatively, the computer-readable storage medium may be an external storage device of the apparatus, for example, a plug-in hard disk, a smart media card (SMC), a Secure Digital (SD) card, or a flash card that is configured on the apparatus. Further, the computer-readable storage medium may alternatively include both the internal storage unit of the apparatus and the external storage device. The computer-readable storage medium is configured to store the computer program and other programs and data that are needed by the apparatus. The computer-readable storage medium may be further configured to temporarily store data that has been output or is to be output.

Optionally, an embodiment of this disclosure further provides a computer program product. All or some of the procedures in the foregoing method embodiments may be implemented by a computer program instructing related hardware. The program may be stored in the computer program product. When the program is executed, the procedures of the foregoing method embodiments may be included.

Optionally, an embodiment of this disclosure further provides a computer instruction. All or some of the procedures in the foregoing method embodiments may be implemented by a computer instruction instructing related hardware (such as a computer, a processor, UE, a data channel service entity, a server, or the like). The program may be stored in the computer-readable storage medium or the computer program product.

Optionally, an embodiment of this disclosure further provides a communication system, including the data channel service entity and the first UE in the foregoing embodiments.

Based on the foregoing descriptions of the implementations, a person skilled in the art may clearly understand that, for the purpose of convenient and brief description, division of the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

In the several embodiments provided in this disclosure, it can be understood that the disclosed apparatus and method may be implemented in other manners. For example, the described apparatus embodiments are merely examples. For example, division into the modules or units is merely logical function division and may be other division during actual implementation. For example, a plurality of units or components may be combined or integrated into another apparatus, or some features may be ignored or not performed. In addition, the displayed or discussed mutual couplings, direct couplings, or communication connections may be implemented through some interfaces. Indirect couplings or communication connections between the apparatuses or units may be implemented in electronic, mechanical, or other forms.

The units described as separate parts may or may not be physically separate, and parts displayed as units may be one or more physical units, in other words, may be located in one place, or may be distributed on different places. Some or all of the units may be selected based on an actual requirement to achieve objectives of the solutions in embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A method implemented by a first user equipment (UE), wherein the method comprises:
establishing a first data channel with a data channel service entity for communicating using a Stream Control Transmission Protocol (SCTP);
triggering, while the first UE and a second UE are in a same call service, the data channel service entity to establish a first video channel with the second UE to transmit data according to a User Datagram Protocol (UDP);
sending, to the data channel service entity through the first data channel, first Real-time Transport Protocol (RTP) data to trigger the data channel service entity to send the first RTP data to the second UE through the first video channel; and
receiving, from the data channel service entity through the first data channel, second RTP data from the first video channel.

2. The method of claim 1, wherein the first RTP data comprises first real-time interaction information, and wherein the second RTP data comprises second real-time interaction information.

3. The method of claim 1, further comprising:
establishing a second data channel with the data channel service entity for communication using the SCTP;
triggering the data channel service entity to establish a second video channel with the second UE to transmit data according to the UDP;
sending, to the data channel service entity through the second data channel, first RTP Control Protocol (RTCP) data to trigger the data channel service entity to send the first RTCP data to the second UE through the second video channel; and
receiving, from the data channel service entity through the second data channel, second RTCP data from the second video channel.

4. The method of claim 1, further comprising sending, to the data channel service entity through the first data channel, first RTP Control Protocol (RTCP) data to trigger the data channel service entity to send the first RTCP data to the second UE through a second video channel and according to the UDP.

5. The method of claim 1, further comprising:
sending, to the data channel service entity, first request information carrying first media description information and first indication information, wherein the first media description information carries a first parameter of the first RTP data, and wherein the first indication information requests to establish the first video channel; and
receiving, from the data channel service entity, response information carrying second media description information, wherein the second media description information carries a second parameter of the second RTP data.

6. The method of claim 5, wherein before sending the first request information, the method further comprises receiving, from the data channel service entity, second indication information instructing to avoid establishing a second data channel between the second UE and the data channel service entity.

7. The method of claim 6, wherein before receiving the second indication information, the method further comprises sending, to the data channel service entity, second request information requesting information about whether to establish the second data channel.

8. The method of claim 6, wherein the first request information further carries a first identifier of the first data channel, and wherein the response information further carries the first identifier.

9. The method of claim 8, wherein the first request information further carries a second identifier of the second data channel, and wherein the response information further carries the second identifier.

10. A first user equipment (UE), comprising:
a memory configured to store instructions; and
at least one processor coupled to the memory and configured to execute the instructions to cause the first UE to:
    establish a first data channel with a data channel service entity for communication using a Stream Control Transmission Protocol (SCTP);
    trigger, while the first UE and a second UE are in a same call service, the data channel service entity to establish a first video channel with the second UE to transmit data according to a User Datagram Protocol (UDP);
    send, to the data channel service entity through the first data channel, first Real-time Transport Protocol (RTP) data to trigger the data channel service entity to send the first RTP data to the second UE through the first video channel; and
    receive, from the data channel service entity through the first data channel, second RTP data from the first video channel.

11. The first UE of claim 10, wherein the first RTP data comprises first real-time interaction information, and wherein the second RTP data comprises second real-time interaction information.

12. The first UE of claim 10, wherein the at least one processor is further configured to execute the instructions to cause the first UE to:
    establish a second data channel with the data channel service entity for communication using the SCTP;
    trigger the data channel service entity to establish a second video channel with the second UE to transmit data according to the UDP;
    send, to the data channel service entity through the second data channel, first RTP Control Protocol (RTCP) data to trigger the data channel service entity to send the first RTCP data to the second UE through the second video channel; and
    receive, from the data channel service entity through the second data channel, second RTCP data from the second video channel.

13. The first UE of claim 10, wherein the at least one processor is further configured to execute the instructions to cause the first UE to receive, from the data channel service entity through the first data channel, second RTCP data.

14. The first UE of claim 10, wherein the at least one processor is further configured to execute the instructions to cause the first UE to:

send, to the data channel service entity, first request information carrying first media description information and first indication information, wherein the first media description information carries a first parameter of the first RTP data, and wherein the first indication information requests to establish the first video channel; and
    receive, from the data channel service entity, response information carrying second media description information, wherein the second media description information carries a second parameter of the second RTP data.

15. The first UE of claim 14, wherein before sending the first request information, the at least one processor is further configured to execute the instructions to cause the first UE to receive, from the data channel service entity, second indication information instructing to avoid establishing a second data channel between the second UE and the data channel service entity.

16. The first UE of claim 15, wherein before receiving the second indication information, the at least one processor is further configured to execute the instructions to cause the first UE to send, to the data channel service entity, second request information requesting information about whether to establish the second data channel.

17. The first UE of claim 15, wherein the first request information further carries a first identifier of the first data channel, and wherein the response information further carries the first identifier.

18. The first UE of claim 17, wherein the first request information further carries a second identifier of the second data channel, and wherein the response information further carries the second identifier.

19. A communication system, comprising:
a data channel service entity configured to:
    establish a first video channel with a second user equipment (UE) to transmit data according to a User Datagram Protocol (UDP);
    receive, through a first data channel, first Real-time Transport Protocol (RTP) data to trigger the data channel service entity to send the first RTP data to the second UE through the first video channel;
    send, to the second UE through the first video channel, the first RTP data;
    receive, from the second UE through the first video channel, second RTP data; and
    send, through the first data channel, the second RTP data; and
a first UE configured to:
    establish the first data channel with the data channel service entity for communication using a Stream Control Transmission Protocol (SCTP);
    trigger, while the first UE and the second UE are in a same call service, the data channel service entity to establish the first video channel with the second UE;
    send, to the data channel service entity through the first data channel, the first RTP data; and
    receive, from the data channel service entity through the first data channel, the second RTP data.

20. The communication system of claim 19, wherein the first RTP data comprises first real-time interaction information, and wherein the second RTP data comprises second real-time interaction information.

* * * * *